(12) United States Patent
Bellman et al.

(10) Patent No.: US 11,905,201 B2
(45) Date of Patent: Feb. 20, 2024

(54) METHODS AND ARTICLES INCLUDING A SHEET AND A CARRIER

(71) Applicant: CORNING INCORPORATED, Corning, NY (US)

(72) Inventors: Robert Alan Bellman, Painted Post, NY (US); Robert George Manley, Vestal, NY (US); Prantik Mazumder, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 390 days.

(21) Appl. No.: 15/739,321

(22) PCT Filed: Jun. 22, 2016

(86) PCT No.: PCT/US2016/038663
§ 371 (c)(1),
(2) Date: Dec. 22, 2017

(87) PCT Pub. No.: WO2016/209897
PCT Pub. Date: Dec. 29, 2016

(65) Prior Publication Data
US 2020/0039872 A1    Feb. 6, 2020

Related U.S. Application Data

(60) Provisional application No. 62/185,095, filed on Jun. 26, 2015.

(51) Int. Cl.
*C03C 15/02* (2006.01)
*B32B 17/10* (2006.01)
(Continued)

(52) U.S. Cl.
CPC ........ *C03C 15/02* (2013.01); *B32B 17/10036* (2013.01); *B32B 17/10128* (2013.01);
(Continued)

(58) Field of Classification Search
CPC ......... C03C 15/02; C03C 15/00; C03C 17/32; C03C 17/30; C03C 27/10;
(Continued)

(56) References Cited

U.S. PATENT DOCUMENTS 3,722,181 A    3/1973   Kirkland
4,096,315 A    6/1978   Kubacki
(Continued)

FOREIGN PATENT DOCUMENTS

CN    101924067 A    12/2010
CN    102034746 A     4/2011
(Continued)

OTHER PUBLICATIONS

Lubguban, Jr. et al; "Low-K Organosilicate Films Prepared by Tetravinyltetramethylcyclotetrasiloxane", J. of Applied Physics, V92, N2, p. 1033-1038, 2002.
(Continued)

*Primary Examiner* — Michael Zhang
(74) *Attorney, Agent, or Firm* — Yunling Shang; Russell S. Magaziner

(57) ABSTRACT

An article includes a carrier including a carrier bonding surface, a sheet including a sheet bonding surface, and a surface modification layer disposed on at least one of the carrier bonding surface and the sheet bonding surface. The surface modification layer includes a plasma polymerized material. The plasma polymerized material planarizes the at least one of the carrier bonding surface and the sheet bonding surface. The carrier bonding surface and the sheet bonding surface are bonded with the surface modification layer so that the carrier is temporarily bonded with the sheet. A method of making an article includes depositing a surface modification layer on at least one of a carrier bonding surface and a sheet bonding surface. The method further
(Continued)

includes bonding the carrier bonding surface and the sheet bonding surface with the surface modification layer to temporarily bond the carrier with the sheet.

15 Claims, 4 Drawing Sheets

(51) Int. Cl.
  *C03C 17/32* (2006.01)
  *C03C 27/10* (2006.01)
(52) U.S. Cl.
  CPC ........ *B32B 17/10577* (2013.01); *C03C 17/32* (2013.01); *C03C 27/10* (2013.01); *B32B 2315/08* (2013.01); *B32B 2457/20* (2013.01); *C03C 2218/153* (2013.01); *C03C 2218/32* (2013.01); *C03C 2218/355* (2013.01)
(58) Field of Classification Search
  CPC .......... C03C 2218/153; C03C 2218/32; C03C 2218/355; C03C 2218/328; B32B 17/10036; B32B 17/10128; B32B 17/10577; B32B 17/1055; B32B 2315/08; B32B 2457/20; B32B 7/06; B32B 7/12; B32B 2307/546; B32B 2307/538; B32B 2551/00; B32B 2551/26; Y10T 428/24355; Y10T 428/269; Y10T 428/31544; Y10T 428/31612
  See application file for complete search history.

(56) References Cited

U.S. PATENT DOCUMENTS

| | | | |
|---|---|---|---|
| 4,179,324 A | 12/1979 | Kirkpatrick |
| 4,397,722 A | 8/1983 | Haller |
| 4,599,243 A | 7/1986 | Sachdev et al. |
| 4,810,326 A | 3/1989 | Babu et al. |
| 4,822,466 A | 4/1989 | Rabalais et al. |
| 4,849,284 A | 7/1989 | Arthur et al. |
| 4,990,462 A | 2/1991 | Sliwa, Jr. |
| 5,073,181 A | 12/1991 | Foster et al. |
| 5,141,800 A | 8/1992 | Effenberger et al. |
| 5,143,747 A | 9/1992 | Matossian et al. |
| 5,222,494 A | 6/1993 | Baker, Jr. |
| 5,357,726 A | 10/1994 | Effenberger et al. |
| 5,413,940 A | 5/1995 | Lin et al. |
| 5,462,781 A | 10/1995 | Zukowski |
| 5,479,043 A | 12/1995 | Nuyen |
| 5,482,896 A | 1/1996 | Tang |
| 5,491,571 A | 2/1996 | Williams et al. |
| 5,554,680 A | 9/1996 | Ojakaar |
| 5,616,179 A | 4/1997 | Baldwin et al. |
| 5,661,618 A | 8/1997 | Brown et al. |
| 5,718,967 A | 2/1998 | Hu et al. |
| 5,755,867 A | 5/1998 | Chikuni et al. |
| 5,820,991 A | 10/1998 | Cabo |
| 5,840,616 A | 11/1998 | Sakaguchi et al. |
| 5,888,591 A | 3/1999 | Gleason et al. |
| 5,904,791 A | 5/1999 | Bearinger |
| 5,966,622 A | 10/1999 | Levine et al. |
| 5,972,152 A | 10/1999 | Lake et al. |
| 6,037,026 A | 3/2000 | Iwamoto |
| 6,091,478 A | 7/2000 | Tanaka et al. |
| 6,124,154 A | 9/2000 | Miyasaka |
| 6,159,385 A | 12/2000 | Yao et al. |
| 6,261,398 B1 | 7/2001 | Costa |
| 6,338,901 B1 | 1/2002 | Veerasamy |
| 6,379,746 B1 | 4/2002 | Birch et al. |
| 6,387,736 B1 | 5/2002 | Cao et al. |
| 6,521,511 B1 | 2/2003 | Inoue et al. |
| 6,521,857 B1 | 2/2003 | Barnett |
| 6,528,145 B1 | 3/2003 | Berger et al. |
| 6,540,866 B1 | 4/2003 | Zhang et al. |
| 6,602,606 B1 | 8/2003 | Fujisawa et al. |
| 6,645,828 B1 | 11/2003 | Farrens et al. |
| 6,649,540 B2 | 11/2003 | Wang et al. |
| 6,687,969 B1 | 2/2004 | Dando |
| 6,699,798 B2 | 3/2004 | Rockford |
| 6,735,982 B2 | 5/2004 | Matthies |
| 6,762,074 B1 | 7/2004 | Draney et al. |
| 6,814,833 B2 | 11/2004 | Sabia |
| 6,815,070 B1 | 11/2004 | Burkle et al. |
| 6,969,166 B2 | 11/2005 | Clark et al. |
| 6,974,731 B2 | 12/2005 | Yamazaki et al. |
| 6,992,371 B2 | 1/2006 | Mancini et al. |
| 7,041,608 B2 | 5/2006 | Sieber et al. |
| 7,045,878 B2 | 5/2006 | Faris |
| 7,056,751 B2 | 6/2006 | Faris |
| 7,060,323 B2 | 6/2006 | Sugahara et al. |
| 7,118,990 B1 | 10/2006 | Xu et al. |
| 7,129,311 B2 | 10/2006 | Teff et al. |
| 7,144,638 B2 | 12/2006 | Leung et al. |
| 7,147,740 B2 | 12/2006 | Takayama et al. |
| 7,166,520 B1 | 1/2007 | Henley |
| 7,220,656 B2 | 5/2007 | Forbes |
| 7,232,739 B2 | 6/2007 | Kerdiles et al. |
| 7,261,793 B2 | 8/2007 | Chen et al. |
| 7,351,300 B2 | 4/2008 | Takayama et al. |
| 7,364,942 B2 | 4/2008 | Martin |
| 7,407,867 B2 | 8/2008 | Ghyselen et al. |
| 7,408,006 B2 | 8/2008 | Comino et al. |
| 7,466,390 B2 | 12/2008 | French et al. |
| 7,482,249 B2 | 1/2009 | Jakob et al. |
| 7,531,590 B2 | 5/2009 | Teff et al. |
| 7,541,264 B2 | 6/2009 | Gardner et al. |
| 7,574,787 B2 | 8/2009 | Xu et al. |
| 7,575,983 B2 | 8/2009 | Hu et al. |
| 7,635,617 B2 | 12/2009 | Yamazaki |
| 7,642,559 B2 | 1/2010 | Yamazaki et al. |
| 7,737,035 B1 | 6/2010 | Lind et al. |
| 7,741,775 B2 | 6/2010 | Yamazaki et al. |
| 7,749,862 B2 | 7/2010 | Schwarzenbach et al. |
| 7,763,365 B2 | 7/2010 | Takeuchi et al. |
| 7,842,548 B2 | 11/2010 | Lee et al. |
| 7,902,038 B2 | 3/2011 | Aspar et al. |
| 7,909,928 B2 | 3/2011 | Lahann et al. |
| 7,939,425 B2 | 5/2011 | Hu et al. |
| 7,960,840 B2 | 6/2011 | Bonifield et al. |
| 7,960,916 B2 | 6/2011 | Kawachi |
| 7,978,282 B2 | 7/2011 | An et al. |
| 7,989,314 B2 | 8/2011 | Lee et al. |
| 8,012,667 B2 | 9/2011 | Nam et al. |
| 8,034,206 B2 | 10/2011 | Kim et al. |
| 8,034,452 B2 | 10/2011 | Padiyath et al. |
| 8,043,697 B2 | 10/2011 | Murakami et al. |
| 8,048,794 B2 | 11/2011 | Knickerbocker |
| 8,069,229 B2 | 11/2011 | Yellapragada et al. |
| 8,105,935 B2 | 1/2012 | Ohara et al. |
| 8,138,614 B2 | 3/2012 | Yamazaki et al. |
| 8,173,249 B2 | 5/2012 | Leu et al. |
| 8,211,259 B2 | 7/2012 | Sato et al. |
| 8,211,270 B2 | 7/2012 | Suzuki et al. |
| 8,236,669 B2 | 8/2012 | Hong et al. |
| 8,268,939 B2 | 9/2012 | Ebbrecht et al. |
| 8,349,727 B2 | 1/2013 | Guo et al. |
| 8,383,460 B1 | 2/2013 | Yim |
| 8,399,047 B2 | 3/2013 | Lahann et al. |
| 8,580,069 B2 | 11/2013 | Watanabe et al. |
| 8,590,688 B2 | 11/2013 | Weigl |
| 8,609,229 B2 | 12/2013 | Kondo |
| 8,656,735 B2 | 2/2014 | Tamitsuji et al. |
| 8,660,052 B2 | 2/2014 | Liang et al. |
| 8,697,228 B2 | 4/2014 | Carre et al. |
| 8,697,728 B2 | 4/2014 | Ashrafian et al. |
| 8,822,306 B2 | 9/2014 | Berger et al. |
| 8,840,999 B2 | 9/2014 | Harimoto et al. |
| 8,993,706 B2 | 3/2015 | Schubert et al. |
| 8,995,146 B2 | 3/2015 | Brooks et al. |
| 9,069,133 B2 | 6/2015 | Baldwin et al. |
| 9,111,981 B2 | 8/2015 | Flaim et al. |
| 9,131,587 B2 | 9/2015 | Zhou |
| 9,269,826 B2 | 2/2016 | Hosono et al. |

(56) References Cited

U.S. PATENT DOCUMENTS

| | | |
|---|---|---|
| 9,612,455 B2 | 4/2017 | Nicolson et al. |
| 9,805,941 B2 | 10/2017 | Kanarik et al. |
| 9,889,635 B2 | 2/2018 | Bellman et al. |
| 10,046,542 B2 | 8/2018 | Adib et al. |
| 10,086,584 B2 | 10/2018 | Bellman et al. |
| 10,543,662 B2 | 1/2020 | Bellman et al. |
| 2001/0045351 A1 | 11/2001 | Koh et al. |
| 2002/0171080 A1 | 11/2002 | Faris |
| 2003/0017303 A1 | 1/2003 | Shindo et al. |
| 2003/0020049 A1 | 1/2003 | Payne et al. |
| 2003/0020062 A1 | 1/2003 | Faris |
| 2003/0057563 A1 | 3/2003 | Nathan et al. |
| 2003/0119336 A1 | 6/2003 | Matsuki et al. |
| 2003/0175525 A1 | 9/2003 | Wochnowski et al. |
| 2003/0210853 A1 | 11/2003 | Kato |
| 2003/0228413 A1 | 12/2003 | Ohta et al. |
| 2004/0033358 A1 | 2/2004 | Coates et al. |
| 2004/0044100 A1 | 3/2004 | Schlenoff et al. |
| 2004/0217352 A1 | 11/2004 | Forbes |
| 2004/0222500 A1 | 11/2004 | Aspar et al. |
| 2004/0247949 A1 | 12/2004 | Akedo et al. |
| 2004/0248378 A1 | 12/2004 | Ghyselen et al. |
| 2004/0258850 A1 | 12/2004 | Straccia et al. |
| 2005/0001201 A1 | 1/2005 | Bocko et al. |
| 2005/0029224 A1 | 2/2005 | Aspar et al. |
| 2005/0059218 A1 | 3/2005 | Faris |
| 2005/0069713 A1 | 3/2005 | Gupta et al. |
| 2005/0081993 A1 | 4/2005 | Ilkka et al. |
| 2005/0118595 A1 | 6/2005 | Lahann |
| 2005/0118742 A1 | 6/2005 | Henning et al. |
| 2005/0136188 A1 | 6/2005 | Chang |
| 2005/0175851 A1 | 8/2005 | Bordunov et al. |
| 2005/0224155 A1 | 10/2005 | Chen et al. |
| 2005/0242341 A1 | 11/2005 | Knudson et al. |
| 2006/0091104 A1 | 5/2006 | Takeshita et al. |
| 2006/0134362 A1 | 6/2006 | Lu et al. |
| 2006/0165975 A1 | 7/2006 | Moser et al. |
| 2006/0166464 A1 | 7/2006 | Jakob et al. |
| 2006/0192205 A1 | 8/2006 | Yamazaki et al. |
| 2006/0246218 A1 | 11/2006 | Bienkiewicz et al. |
| 2006/0250559 A1 | 11/2006 | Bocko et al. |
| 2006/0264004 A1 | 11/2006 | Tong et al. |
| 2007/0048530 A1 | 3/2007 | Tsao et al. |
| 2007/0077353 A1 | 4/2007 | Lee et al. |
| 2007/0077728 A1 | 4/2007 | Kulkarni et al. |
| 2007/0077782 A1 | 4/2007 | Lee et al. |
| 2007/0091062 A1 | 4/2007 | French et al. |
| 2007/0105252 A1 | 5/2007 | Lee et al. |
| 2007/0105339 A1 | 5/2007 | Faris |
| 2007/0111391 A1 | 5/2007 | Aoki et al. |
| 2007/0134784 A1 | 6/2007 | Halverson et al. |
| 2007/0181938 A1 | 8/2007 | Bucher et al. |
| 2007/0248809 A1 | 10/2007 | Haldeman et al. |
| 2008/0044588 A1 | 2/2008 | Sakhrani |
| 2008/0053959 A1 | 3/2008 | Tong et al. |
| 2008/0090380 A1 | 4/2008 | Gardner et al. |
| 2008/0111786 A1 | 5/2008 | Goudarzi |
| 2008/0135175 A1 | 6/2008 | Higuchi |
| 2008/0173992 A1 | 7/2008 | Mahler et al. |
| 2008/0212000 A1 | 9/2008 | French et al. |
| 2008/0309867 A1 | 12/2008 | Kampstra |
| 2009/0020414 A1 | 1/2009 | Tsao et al. |
| 2009/0091025 A1 | 4/2009 | Wong et al. |
| 2009/0110882 A1 | 4/2009 | Higuchi |
| 2009/0126404 A1 | 5/2009 | Sakhrani et al. |
| 2009/0133820 A1 | 5/2009 | Sato et al. |
| 2009/0218560 A1 | 9/2009 | Flaim et al. |
| 2009/0227074 A1 | 9/2009 | Hong et al. |
| 2009/0261062 A1 | 10/2009 | Kim |
| 2009/0262294 A9 | 10/2009 | Templier et al. |
| 2009/0266471 A1 | 10/2009 | Kim et al. |
| 2009/0321005 A1 | 12/2009 | Higuchi et al. |
| 2010/0018505 A1 | 1/2010 | Ma et al. |
| 2010/0038023 A1 | 2/2010 | Kho et al. |
| 2010/0089096 A1 | 4/2010 | Tamitsuji et al. |
| 2010/0101719 A1 | 4/2010 | Otsuka et al. |
| 2010/0151231 A1 | 6/2010 | Matsuo et al. |
| 2010/0187980 A1 | 7/2010 | Langer et al. |
| 2010/0224320 A1 | 9/2010 | Tsai et al. |
| 2010/0308014 A1 | 12/2010 | Cheshire |
| 2010/0316871 A1 | 12/2010 | Fujiwara et al. |
| 2011/0001251 A1 | 1/2011 | Gou et al. |
| 2011/0010905 A1 | 1/2011 | Sturzebecher |
| 2011/0012873 A1 | 1/2011 | Prest et al. |
| 2011/0024166 A1 | 2/2011 | Chang et al. |
| 2011/0026236 A1 | 2/2011 | Kondo et al. |
| 2011/0042649 A1 | 2/2011 | Duvall et al. |
| 2011/0045239 A1 | 2/2011 | Takaya et al. |
| 2011/0048611 A1 | 3/2011 | Carre et al. |
| 2011/0064953 A1 | 3/2011 | O'Rourke et al. |
| 2011/0069467 A1 | 3/2011 | Flaim et al. |
| 2011/0092006 A1 | 4/2011 | An et al. |
| 2011/0102346 A1 | 5/2011 | Orsley et al. |
| 2011/0111194 A1* | 5/2011 | Carre ............... H01L 21/68757 428/215 |
| 2011/0123787 A1 | 5/2011 | Tomamoto et al. |
| 2011/0170991 A1 | 7/2011 | Weigl |
| 2011/0207328 A1 | 8/2011 | Speakman |
| 2011/0227086 A1 | 9/2011 | French |
| 2011/0250427 A1 | 10/2011 | Kotov et al. |
| 2011/0256385 A1 | 10/2011 | Matsuzaki et al. |
| 2011/0272090 A1 | 11/2011 | Higuchi |
| 2011/0304794 A1 | 12/2011 | Noh et al. |
| 2011/0308739 A1 | 12/2011 | McCutcheon et al. |
| 2011/0311789 A1 | 12/2011 | Loy et al. |
| 2011/0318544 A1 | 12/2011 | Chen et al. |
| 2011/0318589 A1 | 12/2011 | Pignatelli et al. |
| 2012/0009703 A1 | 1/2012 | Feinstein et al. |
| 2012/0034437 A1 | 2/2012 | Puligadda et al. |
| 2012/0035309 A1 | 2/2012 | Zhu et al. |
| 2012/0045611 A1 | 2/2012 | Shih et al. |
| 2012/0052654 A1 | 3/2012 | Yang et al. |
| 2012/0061881 A1 | 3/2012 | Bae et al. |
| 2012/0063952 A1 | 3/2012 | Hong et al. |
| 2012/0080403 A1 | 4/2012 | Tomamoto et al. |
| 2012/0083098 A1 | 4/2012 | Berger et al. |
| 2012/0107978 A1 | 5/2012 | Shin et al. |
| 2012/0118478 A1 | 5/2012 | Park et al. |
| 2012/0132885 A1 | 5/2012 | Lippert et al. |
| 2012/0135187 A1 | 5/2012 | Takimoto et al. |
| 2012/0153496 A1 | 6/2012 | Lee et al. |
| 2012/0156457 A1 | 6/2012 | Kondo |
| 2012/0156480 A1 | 6/2012 | Kondo et al. |
| 2012/0171454 A1 | 7/2012 | Kondo et al. |
| 2012/0193029 A1 | 8/2012 | Fay et al. |
| 2012/0202010 A1 | 8/2012 | Uchida |
| 2012/0202030 A1 | 8/2012 | Kondo et al. |
| 2012/0223049 A1 | 9/2012 | Yoshikawa et al. |
| 2012/0228617 A1 | 9/2012 | Ko et al. |
| 2012/0235315 A1 | 9/2012 | Wu et al. |
| 2012/0258320 A1 | 10/2012 | Berger |
| 2012/0272800 A1 | 11/2012 | Lacan et al. |
| 2012/0276689 A1 | 11/2012 | Canale et al. |
| 2012/0315470 A1 | 12/2012 | Hanaki et al. |
| 2012/0329249 A1 | 12/2012 | Ahn et al. |
| 2013/0037960 A1 | 2/2013 | Sadaka et al. |
| 2013/0115441 A1 | 5/2013 | Bookbinder et al. |
| 2013/0188324 A1 | 7/2013 | Lee et al. |
| 2013/0192574 A1 | 8/2013 | Dukkipati et al. |
| 2013/0192754 A1 | 8/2013 | Dukkipati et al. |
| 2013/0203265 A1 | 8/2013 | Hsiao |
| 2013/0209731 A1 | 8/2013 | Nattermann et al. |
| 2013/0230265 A1 | 9/2013 | Hubbard et al. |
| 2013/0239617 A1 | 9/2013 | Dannoux |
| 2013/0270533 A1 | 10/2013 | Crispin et al. |
| 2013/0280495 A1 | 10/2013 | Matsumoto |
| 2014/0042662 A1 | 2/2014 | Tamada et al. |
| 2014/0050911 A1 | 2/2014 | Mauro et al. |
| 2014/0106141 A1* | 4/2014 | Bellman ............. C03C 17/3435 428/201 |
| 2014/0106150 A1* | 4/2014 | Decker ................. C03C 17/38 428/216 |
| 2014/0130969 A1 | 5/2014 | McCutcheon et al. |
| 2014/0150244 A1 | 6/2014 | Liu et al. |

(56) References Cited

U.S. PATENT DOCUMENTS

| | | |
|---|---|---|
| 2014/0165654 A1 | 6/2014 | Bellman et al. |
| 2014/0166199 A1 | 6/2014 | Bellman et al. |
| 2014/0170378 A1 | 6/2014 | Bellman et al. |
| 2014/0210075 A1 | 7/2014 | Lee et al. |
| 2014/0220327 A1 | 8/2014 | Adib et al. |
| 2014/0295590 A1 | 10/2014 | Oh et al. |
| 2015/0060869 A1 | 3/2015 | Ro et al. |
| 2015/0060870 A1 | 3/2015 | Ro et al. |
| 2015/0086794 A1 | 3/2015 | Akita et al. |
| 2015/0099110 A1 | 4/2015 | Bellman et al. |
| 2015/0102498 A1 | 4/2015 | Enicks et al. |
| 2015/0266276 A1 | 9/2015 | Vissing et al. |
| 2015/0290887 A1 | 10/2015 | Swier et al. |
| 2015/0306847 A1 | 10/2015 | Bellman et al. |
| 2015/0329415 A1* | 11/2015 | Bellman ............. B32B 7/06 428/141 |
| 2016/0009958 A1 | 1/2016 | Moore et al. |
| 2016/0017196 A1 | 1/2016 | Moore et al. |
| 2016/0035764 A1 | 2/2016 | Watts |
| 2016/0083835 A1 | 3/2016 | Adib et al. |
| 2016/0211803 A1 | 7/2016 | Ji et al. |
| 2016/0329415 A1 | 11/2016 | He et al. |
| 2017/0036419 A1 | 2/2017 | Adib et al. |
| 2017/0182744 A1 | 6/2017 | Bellman et al. |
| 2017/0320771 A1 | 11/2017 | Adib et al. |
| 2018/0126705 A1 | 5/2018 | Adib et al. |
| 2018/0269071 A1 | 9/2018 | Le et al. |
| 2018/0297324 A1 | 10/2018 | Adib et al. |

FOREIGN PATENT DOCUMENTS

| | | |
|---|---|---|
| CN | 102070120 B | 9/2012 |
| CN | 101916022 B | 10/2012 |
| CN | 102789125 A | 11/2012 |
| CN | 102820262 A | 12/2012 |
| CN | 103042803 A | 4/2013 |
| CN | 102815052 B | 8/2016 |
| DE | 10034737 A1 | 2/2002 |
| DE | 10323303 A1 | 4/2004 |
| DE | 10323304 A1 | 4/2004 |
| DE | 10353530 A1 | 6/2005 |
| EP | 0737258 A1 | 10/1996 |
| EP | 1628339 A1 | 2/2006 |
| EP | 1914066 A1 | 4/2008 |
| EP | 2025650 A1 | 2/2009 |
| EP | 2128105 A1 | 12/2009 |
| EP | 2270865 A2 | 1/2011 |
| EP | 2273475 A1 | 1/2011 |
| EP | 2398040 A1 | 12/2011 |
| EP | 2331436 B1 | 12/2012 |
| FR | 2893750 A1 | 5/2007 |
| GB | 1082116 A | 9/1967 |
| GB | 1373359 A | 11/1974 |
| GB | 1373559 A | 11/1974 |
| GB | 1583544 A | 1/1981 |
| GB | 2481187 A | 12/2011 |
| IN | 200906585 P1 | 5/2012 |
| JP | 1993096235 A | 4/1993 |
| JP | 05-111620 A | 5/1993 |
| JP | 2000241804 A | 9/2000 |
| JP | 2002348150 A | 12/2002 |
| JP | 2003071937 A | 3/2003 |
| JP | 2003077187 A | 3/2003 |
| JP | 2004-066664 A | 3/2004 |
| JP | 2004178891 A | 6/2004 |
| JP | 2005014599 A | 1/2005 |
| JP | 2005300972 A | 10/2005 |
| JP | 2006003684 A | 1/2006 |
| JP | 2007138144 A | 6/2007 |
| JP | 4036018 B2 | 1/2008 |
| JP | 2008072087 A | 3/2008 |
| JP | 2008123948 A | 5/2008 |
| JP | 2009028922 A | 2/2009 |
| JP | 2009028923 A | 2/2009 |
| JP | 2009074002 A | 4/2009 |
| JP | 2009-131732 A | 6/2009 |
| JP | 2009184172 A | 8/2009 |
| JP | 2009283155 A | 12/2009 |
| JP | 2010018505 A | 1/2010 |
| JP | 2010167484 A | 8/2010 |
| JP | 2010-248011 A | 11/2010 |
| JP | 4625913 B2 | 2/2011 |
| JP | 2011-048979 A | 3/2011 |
| JP | 2011-058579 A | 3/2011 |
| JP | 2011-159697 A | 8/2011 |
| JP | 2011201976 A | 10/2011 |
| JP | 2011201977 A | 10/2011 |
| JP | 2011235532 A | 11/2011 |
| JP | 2011235556 A | 11/2011 |
| JP | 2011236349 A | 11/2011 |
| JP | 2011-248011 A | 12/2011 |
| JP | 2012-035532 A | 2/2012 |
| JP | 2012030424 A | 2/2012 |
| JP | 2012-119611 A | 6/2012 |
| JP | 2012-166999 A | 9/2012 |
| JP | 5057657 B2 | 10/2012 |
| JP | 2012209545 A | 10/2012 |
| JP | 2012-212939 A | 11/2012 |
| JP | 2012-227310 A | 11/2012 |
| JP | 2012-248011 A | 12/2012 |
| JP | 5111620 B2 | 1/2013 |
| JP | 2013010340 A | 1/2013 |
| JP | 2013010342 A | 1/2013 |
| JP | 2013184346 A | 9/2013 |
| JP | 2013184872 A | 9/2013 |
| JP | 2013-224475 A | 10/2013 |
| JP | 2013207084 A | 10/2013 |
| JP | 2014019597 A | 2/2014 |
| JP | 2015093405 A | 5/2015 |
| JP | 2015093795 A | 5/2015 |
| JP | 2015116694 A | 6/2015 |
| JP | 2015-209471 A | 11/2015 |
| JP | 2016-106047 A | 6/2016 |
| JP | 2017-500259 A | 1/2017 |
| JP | 2017-500753 A | 1/2017 |
| JP | 2017-087417 A | 5/2017 |
| KR | 92-0016160 A | 9/1992 |
| KR | 10-2008-0096372 A | 10/2008 |
| KR | 2008113576 A | 12/2008 |
| KR | 10-2009-0114195 A | 11/2009 |
| KR | 10-2010-0051499 A | 5/2010 |
| KR | 10-2010-0057521 A | 5/2010 |
| KR | 10-2010-0112628 A | 10/2010 |
| KR | 10-1002936 B1 | 12/2010 |
| KR | 10-2011-0033284 A | 3/2011 |
| KR | 10-2011-0043376 A | 4/2011 |
| KR | 20110045136 A | 5/2011 |
| KR | 10-2011-0068352 A | 6/2011 |
| KR | 10-1073032 B1 | 10/2011 |
| KR | 10-2011-0134708 A | 12/2011 |
| KR | 10-2012-0023063 A | 3/2012 |
| KR | 10-2012-0033284 A | 4/2012 |
| KR | 2012031698 A | 4/2012 |
| KR | 10-2012-0057346 A | 6/2012 |
| KR | 10-2012-0064676 A | 6/2012 |
| KR | 10-2012-0069608 A | 6/2012 |
| KR | 20120056227 A | 6/2012 |
| KR | 10-1164945 B1 | 7/2012 |
| KR | 10-2012-0098640 A | 9/2012 |
| KR | 20120100274 A | 9/2012 |
| KR | 2013003997 A | 1/2013 |
| KR | 2013044774 A | 5/2013 |
| KR | 20130095605 A | 8/2013 |
| KR | 2013104534 A | 9/2013 |
| KR | 10-2014-0027265 A | 3/2014 |
| KR | 10-2014-0114022 A | 9/2014 |
| KR | 10-2015-0038177 A | 4/2015 |
| KR | 10-1522941 B1 | 6/2015 |
| TW | 201315593 A | 4/2013 |
| TW | 201332768 A | 8/2013 |
| TW | 201442968 A | 11/2014 |
| TW | 201545886 A | 12/2015 |
| TW | 201545887 A | 12/2015 |

(56) References Cited

FOREIGN PATENT DOCUMENTS

| WO | 92/22604 A1 | 12/1992 | | |
|---|---|---|---|---|
| WO | 95/17537 A1 | 6/1995 | | |
| WO | 02/84722 A2 | 10/2002 | | |
| WO | 03/44079 A1 | 5/2003 | | |
| WO | 2005048669 A1 | 5/2005 | | |
| WO | 2006/093639 A1 | 9/2006 | | |
| WO | 2007/018028 A1 | 2/2007 | | |
| WO | 2007121524 A1 | 11/2007 | | |
| WO | 2008/007622 A1 | 1/2008 | | |
| WO | 2008044884 A1 | 4/2008 | | |
| WO | 2010/051106 A2 | 5/2010 | | |
| WO | 2010/059710 A1 | 5/2010 | | |
| WO | 2010079688 A1 | 7/2010 | | |
| WO | 2010098762 A1 | 9/2010 | | |
| WO | 2010/121524 A1 | 10/2010 | | |
| WO | 2010/128611 A1 | 11/2010 | | |
| WO | 2010/129459 A2 | 11/2010 | | |
| WO | 2011/031507 A1 | 3/2011 | | |
| WO | 2011/048979 A1 | 4/2011 | | |
| WO | 2011/104500 A1 | 9/2011 | | |
| WO | 2011142280 A1 | 11/2011 | | |
| WO | 2012/000686 A1 | 1/2012 | | |
| WO | 2012/057893 A2 | 5/2012 | | |
| WO | 2012/074952 A1 | 6/2012 | | |
| WO | 2012/144499 A1 | 10/2012 | | |
| WO | 201214499 A1 | 10/2012 | | |
| WO | 2013/006865 A2 | 1/2013 | | |
| WO | 2013044941 A1 | 4/2013 | | |
| WO | 2013058217 A1 | 4/2013 | | |
| WO | 2013119737 A2 | 8/2013 | | |
| WO | 2013/179881 A1 | 12/2013 | | |
| WO | 2014/050798 A1 | 4/2014 | | |
| WO | 2014/093193 A1 | 6/2014 | | |
| WO | 2014/093740 A1 | 6/2014 | | |
| WO | 2014/093776 A1 | 6/2014 | | |
| WO | WO-2014093775 A1 * | 6/2014 | ............... | B32B 7/06 |
| WO | 2014/142280 A1 | 9/2014 | | |
| WO | 2014/151353 A1 | 9/2014 | | |
| WO | 2014163035 A1 | 10/2014 | | |
| WO | 2015/054098 A1 | 4/2015 | | |
| WO | 2015/057605 A1 | 4/2015 | | |
| WO | 2015/112958 A1 | 7/2015 | | |
| WO | 2015113020 A1 | 7/2015 | | |
| WO | 2015113023 A1 | 7/2015 | | |
| WO | 2015119210 A1 | 8/2015 | | |
| WO | 2015156395 A1 | 10/2015 | | |
| WO | 2015157202 A1 | 10/2015 | | |
| WO | 2015163134 A1 | 10/2015 | | |
| WO | 2016017645 A1 | 2/2016 | | |
| WO | 2016/187186 A1 | 11/2016 | | |
| WO | 2016209897 A1 | 12/2016 | | |
| WO | 2018038961 A1 | 3/2018 | | |

OTHER PUBLICATIONS

Nouicer et al; "Superhydrophobic Surface Produced on Polyimide and Silicon by Plasma Enhanced Chemical Vapour Deposition From Hexamethyldisiloxane Precursor"; International Journal of Nanotechnology, vol. 12, Nos. 8/9, 2015; pp. 597-607.
Rouessac et al; "Precursor Chemistry for ULK CVD", Microelectronic Engineering, V82, p. 333-340, 2005.
Groenewoud et al; "Plasma Polymerization of Thiophene Derivatives"; Langmuir, 2003, vol. 19, No. 4; pp. 1368-1374.
Lowe et al; "Plasma Polymerized P-Xylene as a Laser Fusion Target"; Surface Science, 1978, vol. 76, No. 1; pp. 242-256.
2006 Gelest Brochure on Thermal Stability of Silanes, p. 14.
2014 Gelest Brochure—Silane Coupling Agents Connecting Across Boundaries.
3M Dyneon High Temperature Perfluoroelastomer PFE 4131TZ—Technical Data.
Biederman; "The Properties of Films Prepared by the RF Sputtering of PTFE and Plasma Polymerization of Some Freons"; Vacuum, vol. 31, No. 7, Jan. 1, 1981, pp. 285-289.
Boscher et al; "Influence of Cyclic Organosilicon Precursors on the Corrosion of Aluminium Coated Sheet by Atmospheric Pressure Dielectric Barrier Discharge"; Surface and Coatings Technology 205; (2011) 5350-5357.
Cech et al; "Surface-Free Energy of Silicon-Based Plasma Polymer Films"; Silanes and Other Coupling Agents, vol. 5, 2009; pp. 333-348.
Chemraz® "Perfluoroelastomers—Seals That Withstand the Test of Time", Greene Tweed Medical & Biotechnology, 2000, 4 Pages.
Chiao et al; "Worldwide First Ultra-Thin LTPS-TFT LCD by a Glass on Carrier Technology"; V3, Submitted to SID 2015; 5 Pages.
Dupont Kalrez Perfluoroelastomer Parts—Physical Properties and Product Comparisons, Technical Information—Rev. 11, Sep. 2012; 4 Pages.
Girifalco et al; "A Theory for the Estimation of Surface and Interfacial Energies. I. Derivation and Application to Interfacial Tension"; Applied Science Research Lab, Cincinnati Ohio; vol. 61 (1956); pp. 904-909.
Haller; "Polymerization of Aromatic Silanes in RF Plasmas"; J. Electrochem Soc.: Solid-State Science and Technology; vol. 129, No. 1; Jan. 1982; pp. 180-183.
Haque et al; "Preparation and Properties of Plasma-Deposited Films With Surface Energies Varying Over a Wide Range"; Journal of Applied Polymer Science, vol. 32, 4369-4381 (1986).
Iller, John Wiley and Sons; "The Surface Chemistry of Silica"; Chapter 6, 1979, pp. 622-656.
Jaszewski et al; "The Deposition of Anti-Adhesive Ultra-Thin Teflon-Like Films and Their Interaction With Polymers During Hot Embossing"; Applied Surface Science, 143 (1999) 301-308.
Kuritka et al; "Mass Spectrometry Characterization of Methylphenylsilane-Hydrogen RF Plasmas"; Plasma Process. Polym. 2007, 4, 53-61.
Merche et al; "Atmospheric Plasmas for Thin Film Deposition: A Critical Review"; Thin Solid Films 520, (2012) 4219-4236.
Nagai et al; "Structure and Morphology of Phenylsilanes Polymer Films Synthesized by the Plasma Polymerization Method"; Journal of Material Science 33, (1998); 1897-1905.
Nehlsen et al; "Gas Permeation Properties of Plasma Polymerized Thin Film Siloxane-Type Membranes for Temperature up to 350° C."; Journal of Membrane Science; 106 (1995) 1-7.
Parker et al; "Surface Forces Between Plasma Polymer Films"; Langmuir 1994, 10, 276-2773.
Perlast G67P—Technical Data Sheet, Issue 4, Revision 1, Jan. 2006; 1 Page.
Salyk et al; "Plasma Polymerisation of Methylphenylsilane"; Surface & Coatings Technology, 20, (2005) pp. 486-489.
Shieh et al; "Modifications of Low Dielectric Constant Fluorinated Amorphous Carbon Films by Multiple Plasma Treatments"; J. Electro. Soc.; 149 (7) G384-G390 (2002).
Sindorf et al; "Cross-Polarization/Magic-Angle-Spinning Silicon-29 Nuclear Magnetic Resonance Study of Silica Gel Using Trimethylsilane Bonding as a Probe of Surface Geometry and Reactivity"; J. Phys. Chem. 1982, 86, 5208-85219.
Stoffels et al; "Polymerization of Fluorocarbons in Reactive Ion Etching Plasma" Journal of Vacuum Science and Technology; Part A, AVS / AIP, Melville, NY, vol. 16, No. 1, Jan. 1, 1998, pp. 87-95.
Suratawal et al; "Surface Chemistry and Trimethylsilyl Functionalization of Stober Silica Sols"; Journal of Non-Crystalline Solids 316 (2003), pp. 349-363.
Hiltz; Techniques for the Characterization of Fluoroelastomers, Defence R&D Canada—Atlantic Technical Memorandum Dec. 2009; 52 Pages.
Terlingen et al; "Plasma Modification of Polymeric Surfaces for Biomedical Applications"; Advanced Biomaterials in Biomedical Engineering and Drug Delivery Systems, 1996; pp. 38-42.
Tillet et al; "Crosslinking of Fluoroelastomers by "Click" Azide-Nitride Cyloaddtion"; Journal of Polymer Science, Part A: Polymer Chemistry; 2015, 53, pp. 1171-1173.
Tong et al; "Reversible Silicon Wafer Bonding for Surface Protection: Water-Enhanced Debonding"; J. Electrochem. Soc., vol. 139, No. 11, Nov. 1992, pp. L101-L102.
Trelleborg Sealing Solutions, Isolast® Perfluororelastomer Seals, Edition Nov. 2008; pp. 1-16; www.tss.trelleborg.com.

(56) References Cited

OTHER PUBLICATIONS

Van De Ven et al; "Deactivation With Silazanes in Chromatography, Mechanism of the Reaction and Practical Consequences in Capillary GC and RP-HPLC: A29SI CP-MAS NMR Study"; Journal of High Resolution Chromatography & Chromatography Communications; vol. 9, 1986; pp. 741-746.
Wang et al; "Dynamic Contact Angles and Contact Angle Hysteresis of Plasma Polymers"; Langmuir 1994, 10, pp. 3887-3897.
Wu, "Calculation of Interfacial Tension in Polymer Systems"; J. Polymer. Sci.: Part C, No. 34, pp. 19-30 (1971).
Wu; "Polymer Interface and Adhesion"; Modifications of Polymer Surfaces, Chapter 9—Marcel Dekker; pp. 298-321.
Zhuravlev; "The Surface Chemistry of Amorphous Silica. Zhuravlev Model"; Colloids and Surfaces A: Physicochemical and Engineering Aspects; 173 (2000) 1-38.
Morita et al; "Applications of Plasma Polymerization"; Pure & Appl. Chem., vol. 57, No. 9 pp. 1277-1286(1985).
ASTM International E595-07, Standard Test Method for Total Mass Loss and Collected Volatile Condensable Materials from Outgassing in a Vacuum Environment (2013).
English Translation of JP2016547990 Office Action dated Mar. 27, 2019; 3 Pages; Japanese Patent Office.
European Patent Application No. 15740126.6 Office Action dated Jul. 9, 2020; 5 Pages; European Patent Office.
Extended European Search Report and Written Opinion; 15740126.6; dated Jul. 4, 2017; 9 pages; European Patent Office.
Hair; "Hydroxyl Groups on Silica Surface", Journal of Non-Crystalline Solids; 19 (1975) 299-309, COPYRGT. North-Holland Publishing.
International Preliminary Report on Patentability of the International Searching Authority; PCT/US15/12865; dated Aug. 11, 2016; 7 Pages; Korean Intellectual Property Office.
International Search Report and Writien Opinion of the International Searching Authority; PCT/US2016/038663; dated Sep. 23, 2016; 11 Pages; European Patent Office.
International Search Report and Writien Opinion of the International Searching Authority; PCT/US2017/049019; dated Dec. 11, 2017; 14 Pages; Korean Intellectual Property Office.
International Search Report and Writien Opinion of the International Searching Authority; PCT/US2017/049025; dated Feb. 22, 2018; 17 Pages; European Patent Office.
International Search Report and Writien Opinion of the International Searching Authority; PCT/US2018/047056; dated Dec. 7, 2018; 10 Pages; European Patent Office.
International Search Report and Written Opinion of the International Searching Aurthority; PCT/US2017/046836; dated Feb. 7, 2018; 11 Pages; Korean Intellectual Property Office.
International Search Report and Written Opinion of the International Searching Authority; PCT/US15/12865; dated May 22, 2015; 8 Pages; Korean Intellectual Property Office.
International Search Report and Written Opinion of the International Searching Authority; PCT/US2013/073785; dated Mar. 24, 2014; 11 Pages; Korean Patent Office.
International Search Report and Written Opinion of the International Searching Authority; PCT/US2013/074859; dated Mar. 25, 2014; 10 Pages; Korean Patent Office.
International Search Report and Written Opinion of the International Searching Authority; PCT/US2013/074924; dated Mar. 27, 2014; 14 pages; Korean Patent Office.
International Search Report and Written Opinion of the International Searching Authority; PCT/US2013/074926; dated Mar. 21, 2014; 13 Pages; European Patent Office.
International Search Report and Written Opinion of the International Searching Authority; PCT/US2014/059237; dated Mar. 11, 2015; 15 Pages; European Patent Office.
International Search Report and Written Opinion of the International Searching Authority; PCT/US2014/060340; dated Jan. 29, 2015; 13 Pages; European Patent Office.
International Search Report of the International Searching Authority; PCT/US2016/032843; dated Aug. 10, 2016; 14 Pages; European Patent Office.
Invitation to Pay Additional Fees From the International Searching Aurthority; PCT/US2017/049025; dated Nov. 21, 2017; 14 Pages; European Patent Office.
ISR from PCT/US2015/013012.
ISR from PCT/US2015/013017.
ISR from WO2014/'151353.
ISR from WO2014/093775.
ISR from WO2015/054098.
ISR from WO2015/057605.
Kuschnereit et al; "Mechanical and Elastic Properties of Amorphous Hydrogenated Silicon Films Studied by Broadband Surface Acoustic Wave Spectroscopy"; Appl. Phys. A 61, 269-276 (1995).
Maszara et al; "Bonding of Silicon Wafers for Silicon-on-Insulators"; J. Appl. Phys. 64 (10), Nov. 15, 1988; pp. 4943-4950.
Mazumder et al (WO 2015-112958), (Year: Jul. 30, 2015).
McMillian et al.; "Hydroxyl Sites in SiO2 Glass: A Note on Irfrared and Raman Spectra", American Mineralogist, vol. 71, pp. 772-778, 1986.
Oujja et al; "Multiphoton Dissociation of Phenylsilane Upon Excitation At 212.5NM"; Laser Chem., vol. 16, pp. 157-166.
PCT-International Search Report form 220 for WO 14/093193; dated Mar. 24, 2014.
PCT—International Search Report form 220 for WO 14/093740; dated Mar. 25, 2014.
PCT—International Search Report form 220 for WO 14/093776; dated Mar. 21, 2014.
Tauc et al; "Optical Properties and Electronic Structure of Amorphous Germanium"; Phys. Stat. Sol. 15, (1966) pp. 627-637.
Weidman et al; "New Photodefinable Glass Etch Masks for Entirely Dry Photolithography Plasma Deposited Organosilicon Hydride Polymers"; Appl. Phys. Leti. 62 (4), Jan. 25, 1993 pp. 372-374.
Worldwide First Ultra-thin LTPS-TFT LCD by A Glass on Carrier Technology, Chiao, et al., v3, submitted to SID 2015.
Japanese Patent Application No. 2017-566697, Notice of Reasons for Refusal dated Feb. 1, 2021, 8 pages (4 pages of English Translation and 4 pages of Original Document); Japanese Patent Office.
Sohn, et al., "Effects of plasma polymerized para-xylene intermediate layers on characteristics of flexible organic light emitting diodes fabricated on polyethylene terephthalate substrates" Journal of Alloys and Compounds, 449, 191-195, 2008. (Year: 2008).

* cited by examiner

METHODS AND ARTICLES INCLUDING A SHEET AND A CARRIER

CROSS-REFERENCE TO RELATED APPLICATIONS

This application claims the benefit of priority under 35 U.S.C. § 371 of International Patent Application Serial No. PCT/US16/38663, filed on Jun. 22, 2016, which in turn, claims the benefit of priority of U.S. Provisional Patent Application Serial No. 62/185,095 filed on Jun. 26, 2015, the contents of each of which are relied upon and incorporated herein by reference in their entireties.

TECHNICAL FIELD

The disclosure relates generally to methods and articles including a sheet and a carrier and, more particularly, to methods and articles providing a sheet that is temporarily bonded to a carrier.

BACKGROUND

There is a desire to provide flexible glass sheets that provide the potential to fabricate thinner, lighter, more flexible and more durable display configurations. However, the increased flexibility of the glass sheets provides an obstacle in processing the glass sheets with equipment typically designed to process relatively thick and relatively rigid glass sheets. To address the concern, the flexible glass sheet may be temporarily bonded to a carrier. The resulting article is relatively thicker and relatively more rigid compared to the flexible glass sheet itself. The article may then be handled by the equipment that processes the glass sheet while the glass sheet remains bonded to the carrier. After processing, the flexible glass sheet may be removed from the carrier for subsequent use in displays or other devices.

There is a desire to temporarily bond a flexible sheet (e.g. a flexible glass sheet) to a carrier by use of van der Waals bonding that is sufficient to retain bonding of the sheet to the carrier while the article is handled by the processing equipment. Still further, there is a desire to temporarily bond the flexible sheet to the carrier in such a manner as to inhibit, for example prevent or reduce, covalent bond formation between the sheet and the carrier that can complicate or prevent subsequent removal of the sheet from the carrier without damaging or destroying the sheet and/or the carrier. Increasing the surface roughness of one of a carrier bonding surface and a sheet bonding surface may inhibit, for example prevent or reduce, covalent bond formation between the sheet and the carrier during or following high temperature processing. However the increased surface roughness can significantly reduce the van der Waals bonding forces used during low temperature processing to bond the sheet and the carrier together to the point that spontaneous bonding of the surfaces does not occur, or any bonding of the surfaces that does occur may be so weak that the bond cannot survive processing with the equipment.

SUMMARY

The following presents a simplified summary of the disclosure in order to provide a basic understanding of some example aspects described in the detailed description. The present disclosure provides a surface modification layer including a plasma polymerized material. The plasma polymerized material planarizes at least one of the carrier bonding surface and the sheet bonding surface having an otherwise moderate surface roughness (surface roughness as described herein refers to root mean square surface roughness, Rq). By reducing the surface roughness with the plasma polymerized material, van der Waals bonding forces may be high enough to permit an initial bond of the sheet to the carrier that will survive processing with the equipment. At the same time, the plasma polymerized material inhibits, for example prevents or reduces, covalent bond formation between the sheet and the carrier that would otherwise prevent separation of the sheet from the carrier following processing.

In a first aspect of the disclosure, an article includes a carrier including a carrier bonding surface, a sheet including a sheet bonding surface, and a surface modification layer disposed on at least one of the carrier bonding surface and the sheet bonding surface. The surface modification layer includes a plasma polymerized material. The plasma polymerized material planarizes the at least one of the carrier bonding surface and the sheet bonding surface. The carrier bonding surface and the sheet bonding surface are bonded with the surface modification layer so that the carrier is temporarily bonded with the sheet.

In one example of the first aspect, the at least one of the planarized carrier bonding surface and the planarized sheet bonding surface has a surface roughness Rq less than about 0.8 nm.

In a further example of the first aspect, the at least one of the carrier bonding surface and the sheet bonding surface has a surface roughness Rq within a range of about 0.8 nm to about 5.0 nm.

In another example of the first aspect, the at least one of the carrier bonding surface and the sheet bonding surface has a surface roughness Rq greater than about 2.0 nm.

In yet another example of the first aspect, the surface modification layer has at least one of an elastic modulus and a plasticity so that at least one of a portion of the carrier bonding surface and a portion of the sheet bonding surface may penetrate into the surface modification layer. For example, the elastic modulus is within a range of from about 0.6 GPa to about 20 GPa.

In still another example of the first aspect, at least one of the carrier and the sheet includes glass.

In still another example of the first aspect, the carrier has a thickness within a range of from about 200 microns to about 3 mm.

In still another example of the first aspect, the sheet has a thickness less than or equal to about 300 microns.

In still another example of the first aspect, the surface modification layer has a thickness within a range from about 0.1 nm to about 100 nm.

The first aspect may be provided alone or in combination with one or any combination of the examples of the first aspect discussed above.

In a second aspect of the disclosure, an article includes a carrier including a carrier bonding surface, a sheet including a sheet bonding surface, and at least one of a carrier surface modification layer disposed on the carrier bonding surface and a sheet surface modification layer disposed on the sheet bonding surface. The at least one of the carrier surface modification layer and the sheet surface modification layer includes a plasma polymerized material. The plasma polymerized material planarizes the at least one of the carrier bonding surface and the sheet bonding surface. The carrier bonding surface and the sheet bonding surface are bonded with at least one of the carrier surface modification layer and the sheet surface modification layer so that the carrier is temporarily bonded with the sheet.

In one example of the second aspect, with respect to the at least one of the carrier surface modification layer and the sheet surface modification layer, the article includes only the carrier surface modification layer. At least a portion of the sheet bonding surface penetrates into the carrier surface modification layer.

In another example of the second aspect, with respect to the at least one of the carrier surface modification layer and the sheet surface modification layer, the article includes only the sheet surface modification layer. At least a portion of the carrier bonding surface penetrates into the sheet surface modification layer.

In yet another example of the second aspect, with respect to the at least one of the carrier surface modification layer and the sheet surface modification layer, the article includes both the carrier surface modification layer and the sheet surface modification layer. At least one of (i) a portion of the sheet bonding surface penetrates into the carrier surface modification layer and (ii) a portion of the carrier bonding surface penetrates into the sheet surface modification layer.

In still another example of the second aspect, the at least one of the planarized carrier bonding surface and the planarized sheet bonding surface has a surface roughness Rq less than about 0.8 nm.

In still another example of the second aspect, the at least one of the carrier bonding surface and the sheet bonding surface has a surface roughness Rq within a range of about 0.8 nm to about 5.0 nm.

The second aspect may be provided alone or in combination with one or any combination of the examples of the second aspect discussed above.

In a third aspect of the disclosure, a method of making an article includes depositing a surface modification layer on at least one of a carrier bonding surface of a carrier and a sheet bonding surface of a sheet. The surface modification layer includes a plasma polymerized material. The plasma polymerized material planarizes the at least one of the carrier bonding surface and the sheet bonding surface. The method includes bonding at least one of the carrier bonding surface and the sheet bonding surface with the surface modification layer so that the carrier is temporarily bonded with the sheet.

In one example of the third aspect, the at least one of the planarized carrier bonding surface and the planarized sheet bonding surface has a surface roughness Rq less than about 0.8 nm.

In another example of the third aspect, the at least one of the carrier bonding surface and the sheet bonding surface has a surface roughness Rq within a range of about 0.8 nm to about 5.0 nm.

In yet another example of the third aspect, the method further includes at least one of an elastic modulus and a plasticity of the surface modification layer that allow penetration of at least one of a portion of the carrier bonding surface and a portion of the sheet bonding surface into the surface modification layer.

The third aspect may be provided alone or in combination with one or any combination of the examples of the third aspect discussed above.

BRIEF DESCRIPTION OF THE DRAWINGS

The above and other features, aspects and advantages of the present invention are better understood when the following detailed description of the invention is read with reference to the accompanying drawings, in which.

DETAILED DESCRIPTION

Figure 1:
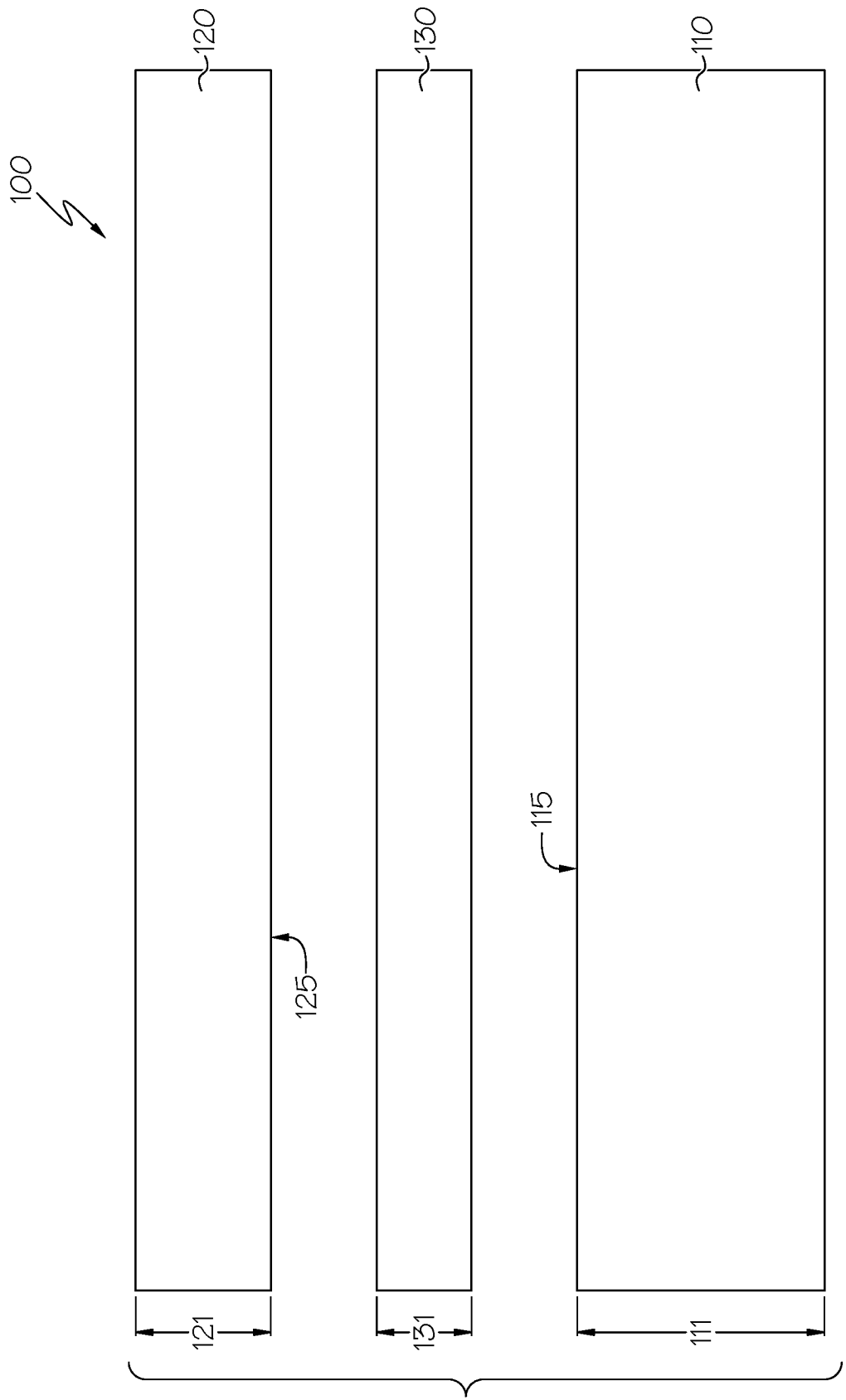
FIG. 1 illustrates an example article in an unassembled (e.g. unbonded) state.

Examples will now be described more fully hereinafter with reference to the accompanying drawings. Whenever possible, the same reference numerals are used throughout the drawings to refer to the same or like parts.

Figure 2:
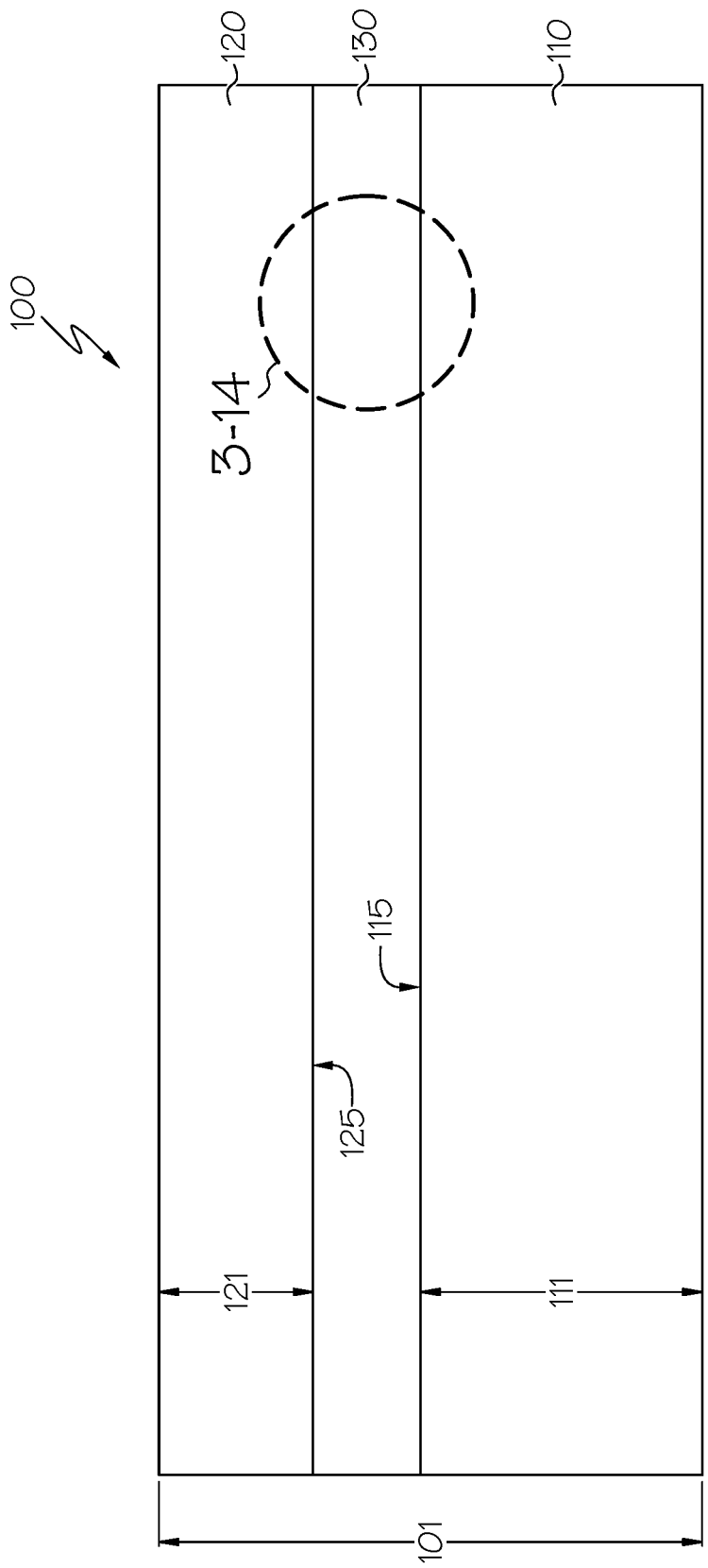
FIG. 2 illustrates an example article in an assembled (e.g. temporarily bonded) state.

Referring to FIG. 1 and FIG. 2, an example article 100 is provided with various example features that may be used either alone or in combination. The example article 100 is illustrated in FIG. 1 in an unassembled (e.g. unbonded) state, while the example article 100 is illustrated in FIG. 2 in an assembled (e.g. bonded state). As shown, the article 100 can include a carrier 110, a sheet 120, and a surface modification layer 130. The carrier can include a carrier bonding surface 115. The sheet can include a sheet bonding surface 125. As shown in FIG. 2, the carrier bonding surface 115, the sheet bonding surface 125, and the surface modification layer 130 can be bonded together to form the article 100, so that the carrier 110 is temporarily bonded with the sheet 120.

The carrier 110 can be made of or include glass (e.g. alumino-silicate, boro-silicate, alumino-boro-silicate, soda-lime-silicate, and alkali containing or alkali-free), ceramic, glass-ceramic, metal, silicon, polysilicon, single crystal silicon, sapphire, quartz or any other material including those not explicitly listed herein either alone or in combination with other materials. Additionally, the carrier 110 may include one layer, as shown, or multiple layers (including multiple layers of the same or a different material) that are bonded together. Further, the carrier 110 may be of a Gen 1 size or larger, for example, Gen 2, Gen 3, Gen 4, Gen 5, Gen 8 or larger (e.g. sheet sizes from 100 mm×100 mm to 3 meters×3 meters or greater). The sheet 120 can be made of or include glass (e.g. alumino-silicate, boro-silicate, alumino-boro-silicate, soda-lime-silicate, and alkali containing or alkali-free), ceramic, glass-ceramic, metal, a polymer or polymers, a composite of a polymer or polymers and glass, silicon, polysilicon, single crystal silicon, sapphire, quartz, or any other material including those not explicitly listed herein either alone or in combination with other materials. Further, the sheet 120 may be of a Gen 1 size or larger, for example, Gen 2, Gen 3, Gen 4, Gen 5, Gen 8, or larger (e.g. sheet sizes from 100 mm×100 mm to 3 meters×3 meters or greater). Still further, the sheet 120 can be an interposer (e.g. an interposer sheet or an interposer wafer) comprising through hole vias.

The article 100 can have an article thickness 101, the carrier 110 can have a carrier thickness 111, the sheet 120 can have a sheet thickness 121, and the surface modification layer 130 can have a surface modification layer thickness 131. The article thickness 101 includes the carrier thickness 111, the sheet thickness 121, and the surface modification layer thickness 131. In one example, the article 100 has an article thickness 101 within a range from about 0.4 mm to about 3.0 mm, including but not limited to greater than or equal to 0.4 mm, 0.5 mm, 0.6 mm, 0.7 mm, 0.8 mm, 0.9 mm, 1.0 mm, 2.0 mm, or 3.0 mm. It is to be understood that the article 100 can have an article thickness 101 that can be any thickness, including any thickness not explicitly disclosed herein (e.g. a thickness less than 0.4 mm, a thickness greater than 3.0 mm, or any other thickness). In another example, the carrier 110 can have a carrier thickness 111 within a range from about 0.2 mm to about 3 mm, including but not limited to 0.2 mm, 0.3 mm, 0.4 mm, 0.5 mm, 0.6 mm, 0.65 mm, 0.7 mm, 1.0 mm, 2.0 mm, or 3.0 mm. It is to be understood that the carrier can have a carrier thickness 111 that can be any thickness, including any thickness not explicitly disclosed herein (e.g. a thickness less than 0.2 mm, a thickness greater than 3 mm, or any other thickness). In yet another example, the sheet 120 can have a sheet thickness 121 less than or equal to about 300 microns, including but not limited 10-50 microns, 50-100 microns, 100-150 microns, 150-300 microns, or less than or substantially equal to 300, 250, 200, 190, 180, 170, 160, 150, 140, 130, 120, 110, 100, 90, 80, 70, 60, 50, 40, 30, 20, or 10 microns. It is to be understood that the sheet 120 can have a sheet thickness 121 that can be any thickness, including any thickness not explicitly disclosed herein (e.g. a thickness greater than 300 microns, or any other thickness). In still another example, the surface modification layer 130 can have a surface modification layer thickness 131 within a range from about 0.1 nm to about 100 nm. It is to be understood that the surface modification layer 130 can have a surface modification layer thickness 131 that can be any thickness, including any thickness not explicitly disclosed herein (e.g. a thickness less than 0.1 nm, a thickness greater than 100 nm, or any other thickness).

In some examples, the article thickness 101 can be configured to provide an article 100 having an article thickness 101 that can be processed in processing equipment, including existing processing equipment. For example, the carrier bonding surface 115, the sheet bonding surface 125, and the surface modification layer 130 can be bonded together and then undergo various processing. Following the processing, the sheet 120 and the carrier 110, including any devices that may be fabricated on the sheet during the processing, can be separated and the carrier 110 can be reused, for example. Some types of processing include vacuum processing, wet processing, ultrasonic cleaning processing, spin-rinse-dry (SRD) processing, and high temperature processing for example, FPD processing, p-Si and oxide TFT fabrication, IGZO backplane processing, and LTPS, amorphous silicon (aSi) bottom gate TFT, polycrystalline silicon (pSi) top gate TFT, amorphous oxide (IGZO) bottom gate TFT, touch screen fabrication, and interposer fabrication.

The surface modification layer 130 is configured to control a strength of the bond (e.g. energy of adhesion or bond energy) between the carrier bonding surface 115 and the sheet bonding surface 125. In particular, the surface modification layer 130 is bonded with the carrier bonding surface 115 and the sheet bonding surface 125 in a manner sufficient to keep the sheet 120 and the carrier 110 bonded together during processing of the article 100, while allowing the sheet 120 and the carrier 110 to be separated without damage (e.g. catastrophic damage, for example breaking of either of the carrier 110 or the sheet 120 into two or more pieces) following processing, i.e., so that the sheet 120 is temporarily bonded with the carrier 110. The surface modification layer 130 can include a plasma polymerized material, formed by plasma deposition for example. As will be discussed more fully below, the plasma polymerized material can planarize the at least one of the carrier bonding surface 115 and the sheet bonding surface 125.

In general, the energy of adhesion (W) between two surfaces, as originally defined by Dupre (1869), is given by:

$$W = Y_1 + Y_2 - Y_{12} \tag{1}$$

("A theory for the estimation of surface and interfacial energies. I. derivation and application to interfacial tension," L. A. Girifalco and R. J. Good, J. Phys. Chem., V 61, p 904) where, $(Y_1)$, $(Y_2)$, and $(Y_{12})$, $Y_1, Y_2$ and $Y_{12}$ are the surface energies of surface 1, surface 2, and the interfacial energy of surface 1 and surface 2, respectively. The individual surface energies (Y) are usually a combination of two terms: a dispersion component $(Y^d)$, and a polar component $(Y^p)$, where $$Y = Y^d + Y^p \tag{2}$$

When the adhesion is mostly due to London dispersion forces $(Y^d)$ and polar forces $(Y^p)$, for example hydrogen bonding, the interfacial energy $(Y_{12})$ can be given by:

$$Y_{12} = Y_1 + Y_2 - 2\sqrt{Y_1^d Y_2^d} - \sqrt{2 Y_1^p Y_2^p} \tag{3}$$

(Girifalco and R. J. Good, as mentioned above).

After substituting (3) in (1), the energy of adhesion (W) can be approximated as:

$$W \sim 2[\sqrt{Y_1^d Y_2^d} + \sqrt{2 Y_1^p Y_2^p}] \tag{4}$$

In the above equation (4), only van der Waals (and/or hydrogen bonding) components of adhesion energies are considered. These include polar-polar interaction (Keesom), polar-non polar interaction (Debye) and nonpolar-nonpolar interaction (London). However, other attractive energies may also be present, for example, covalent bonding and electrostatic bonding. Thus, in a more generalized form, the above equation (4) can be written as:

$$W \sim 2[\sqrt{Y_1^d Y_2^d} + \sqrt{2 Y_1^p Y_2^p}] + W_c + W_e \tag{5}$$

where $(W_c)$ and $(W_e)$ are the covalent and electrostatic adhesion energies.

Bond energy is the energy required to separate a sheet from a carrier. The bond energy may be measured in various different manners. For example, as used herein, the bond energy can be measured as follows.

Bond energy can be measured using the double cantilever beam method (also known as the wedge method). In this method, a wedge of known thickness (t) is placed between the bonded sheet and the carrier at an edge. The wedge creates a characteristic delamination distance (L). This delamination distance is measured and used to calculate the bond energy $(Y_{BE})$.

$$Y_{BE} = \frac{3t^2 E_1 t_1^3 E_2 t_2^3}{16 L^4 (E_1 t_1^3 + E_2 t_2^3)} \tag{6}$$

where $(E_1)$ is the Elastic modulus of the carrier, $(t_1)$ is the thickness of the carrier, $(E_2)$ is the Elastic modulus of the sheet, and $(t_2)$ is the thickness of the sheet.

Covalent adhesion energy, for example as in silicon wafer bonding, includes a situation where an initially hydrogen bonded pair of wafers are heated to a higher temperature to convert much or all the silanol-silanol hydrogen bonds to Si—O—Si covalent bonds. The initial, room temperature, hydrogen (or van der Waals) bonding produces an adhesion energy of approximately 100-200 mJ/m² which is sufficient to hold the wafers together during certain processing while still permitting separation of the bonded surfaces. However, during high temperature processing (e.g. processing including temperatures within a range from about 400 to about 800° C.), a fully covalently bonded wafer pair is formed and the bonded surfaces cannot be separated. The bond created during the high temperature processing has an adhesion energy of approximately 1000-3000 mJ/m$^2$ and the two wafers act as a monolith (e.g. the sheet bonding surface 125 is permanently bonded to the carrier bonding surface 115).

In another example, if both surfaces to be bonded are perfectly coated with a low surface energy material (e.g. a hydrocarbon polymer or a fluoropolymer) having a thickness large enough to shield the effect of the underlying substrate, the adhesion energy is that of the low surface energy coating material. This bond can be very low leading to low or no adhesion between the bonding surfaces such that the bonded article cannot undergo processing without, for example, the sheet 120 separating from the carrier 110.

Consider two cases: (a) two standard clean 1 (e.g. SC1, as is known in the art) cleaned glass surfaces saturated with silanol groups bonded together at room temperature via hydrogen bonding (whereby the adhesion energy is approximately 100-200 mJ/m$^2$) followed by heating to a high temperature which converts the silanol groups to covalent Si—O—Si bonds (whereby the adhesion energy becomes approximately 1000-3000 mJ/m$^2$); and (b) two glass surfaces perfectly coated with a coating with low surface adhesion energy (e.g. about 12 mJ/m$^2$ per surface) bonded at room temperature and heated to a high temperature. In case (a), the adhesion energy after heating to a high temperature is too strong for the pair of glass surfaces to be detachable. In the case (b), not only do the surfaces not bond at room temperature (because the total adhesion energy of about 24 mJ/m$^2$, when the surfaces are put together, is too low), but they also do not bond at high temperature as there are no (or too few) polar reacting groups. Accordingly, between these two extremes, a range of adhesion energies exists, for example between about 50-1000 mJ/m$^2$, which can produce the desired degree of controlled, or temporary, bonding.

The present application discloses methods and apparatus for providing an article 100 including a surface modification layer 130 configured to temporarily bond the carrier bonding surface 115 and the sheet bonding surface 125, for example, during processing, while also permitting separation of the carrier 110 and the sheet 120 following processing. Equation (5) describes that the adhesion energy is a function of four surface energy parameters plus the covalent and electrostatic energy, if any. Therefore, an appropriate adhesion energy can be achieved by controlling surface modifiers (e.g. the surface modification layer 130). In one example, at least one of the carrier 110 and the sheet 120 includes glass.

Furthermore, the present application discloses unexpected results. In particular, it was expected that depositing a coating or layer (e.g. surface modification layer 130) on at least one of the carrier bonding surface 115 and the sheet bonding surface 125 would have no effect (e.g. remain the same) or emphasize (e.g. increase) a surface roughness (e.g. a surface roughness Rq) of the at least one of the carrier bonding surface 115 and the sheet bonding surface 125. However, the present application discloses a surface modification layer 130 disposed on at least one of the carrier bonding surface 115 and the sheet bonding surface 125, wherein the surface modification layer 130 comprises a plasma polymerized material, and wherein—unexpectedly—the plasma polymerized material planarizes (e.g. reduces a surface roughness of) the at least one of the carrier bonding surface 115 and the sheet bonding surface 125.

Based on the surprising and unexpected planarization associated with the plasma polymerized material, the carrier bonding surface 115, the sheet bonding surface 125, and the surface modification layer 130 are bonded together such that the article 100 can undergo processing and, following processing, the carrier 110 and the sheet 120 can be separated from each other, i.e., the carrier 110 is temporarily bonded with the sheet 120. It is to be understood, with respect to the surface modification layer 130 "planarizing" the at least one of the carrier bonding surface 115 and the sheet bonding surface 125, that the surface modification layer 130 is to be understood as disposed on the at least one of the carrier bonding surface 115 and the sheet bonding surface 125. That is, the surface modification layer forms a layer or coating on the at least one of the carrier bonding surface 115 and the sheet bonding surface 125, and, once disposed on these surfaces, the layer or coating has a surface roughness (e.g. a surface roughness Rq) that either alone or in combination with the surface roughness (e.g. surface roughness Rq) of the underlying at least one of the carrier bonding surface 115 and the sheet bonding surface 125 is less than the surface roughness (e.g. surface roughness Rq) of the underlying at least one of the carrier bonding surface 115 and the sheet bonding surface 125.

For example, the at least one of the planarized carrier bonding surface and the planarized sheet bonding surface can have a surface roughness Rq less than about 0.8 nm. In another example, the at least one of the carrier bonding surface 115 and the sheet bonding surface 125, without planarization, can have a surface roughness Rq within a range of about 0.8 nm to about 5.0 nm. In yet another example, the at least one of the carrier bonding surface 115 and the sheet bonding surface 125, without planarization, can have a surface roughness Rq greater than about 2.0 nm. In still another example, the surface modification layer 130 has an elastic modulus and a plasticity. At least one of the elastic modulus and the plasticity can be such that at least a portion of at least one of the carrier bonding surface 115 and the sheet bonding surface 125 may penetrate into the surface modification layer 130. For example, the elastic modulus can be within a range of from about 0.6 GPa to about 20 GPa. It is to be understood that the surface modification layer 130 can have at least one of an elastic modulus and a plasticity such that at least a portion of at least one of the carrier bonding surface 115 and the sheet bonding surface 125 may penetrate into the surface modification layer 130, including any elastic modulus or plasticity not explicitly disclosed herein (e.g. an elastic modulus less than 0.6 GPa, an elastic modulus greater than 20 GPa, or any other elastic modulus or plasticity).

An example method of making an article includes depositing a surface modification layer 130 on at least one of a carrier bonding surface 115 of a carrier 110 and a sheet bonding surface 125 of a sheet 120. The surface modification layer 130 comprises a plasma polymerized material. The plasma polymerized material planarizes the at least one of the carrier bonding surface 115 and the sheet bonding surface 125. The method further includes bonding at least one of the carrier bonding surface 115 and the sheet bonding surface 125 with the surface modification layer 130. In one example, the method further includes choosing at least one of an elastic modulus and a plasticity of the surface modification layer 130 to allow penetration of at least a portion of at least one of the carrier bonding surface 115 and the sheet bonding surface 125 into the surface modification layer 130.

FIGS. 3-14 illustrate various different embodiments by which the carrier bonding surface 115 and the sheet bonding surface 125 can be bonded with the surface modification layer 130 so that the carrier 110 is temporarily bonded with the sheet 120. For illustrative purposes, the corresponding surface roughness (e.g. surface roughness Rq) of the carrier bonding surface 115, the sheet bonding surface 125, and the surface modification layer 130 is shown as a relative surface roughness. Further, the surface modification layer 130 can be disposed over the entirety of the at least one of the carrier bonding surface 115 and the sheet bonding surface 125 (e.g. 100% coverage). In other examples, the surface modification layer 130 can be disposed over less than the entirety of the at least one of the carrier bonding surface 115 and the sheet bonding surface 125 (e.g. less than 100% coverage).

Still further, it is to be understood that the surface roughness is illustrated as a jagged or triangular pattern merely for illustrative purposes and is not to be construed as limiting the scope of disclosure. Any shape, size, or distribution of asperities on any one or more of the carrier bonding surface 115, the sheet bonding surface 125, and the surface modification layer 130 are contemplated herein. Moreover, the at least one of the carrier bonding surface 115 and the sheet bonding surface 125 can penetrate any amount into the surface modification layer 130. It is to be understood that the more penetration of the at least one of the carrier bonding surface 115 and the sheet bonding surface 125 into the surface modification layer 130, the greater the corresponding surface area of the at least one of the carrier bonding surface 115 and the sheet bonding surface 125 in contact with the surface modification layer 130, and the greater the bond strength (e.g. energy of adhesion) between the at least one of the carrier bonding surface 115 and the sheet bonding surface 125 and the surface modification layer 130. The amount of penetration can be controlled, for example, by at least one of adjusting at least one of the elastic modulus and the plasticity of the surface modification layer 130, and applying varying amounts of pressure (e.g. by lamination, or in an autoclave) on at least one of the carrier 110 and the sheet 120, and varying the thickness of the surface modification layer 130 such that the at least one of the carrier bonding surface 115 and the sheet bonding surface 125 penetrates a greater amount or a lesser amount into the surface modification layer 130.

Figure 3:
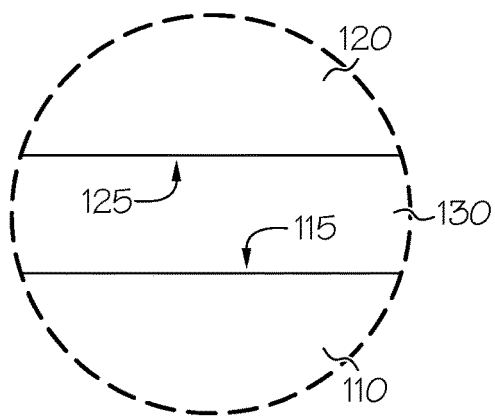
FIGS. 3-14 illustrate various embodiments by which at least one of a carrier bonding surface and a sheet bonding surface is bonded with a surface modification layer so that a carrier is temporarily bonded with a sheet.
Figure 4:
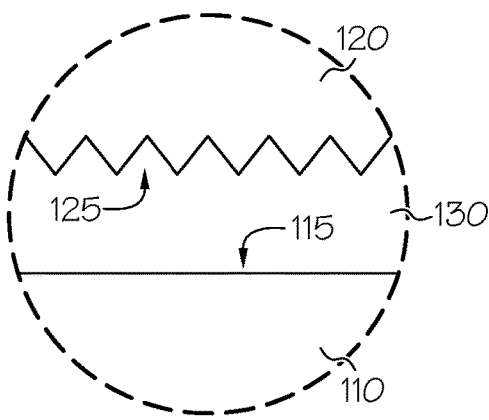
Figure 5:
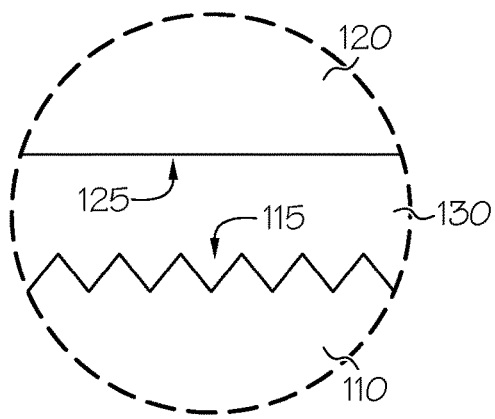
Figure 6:
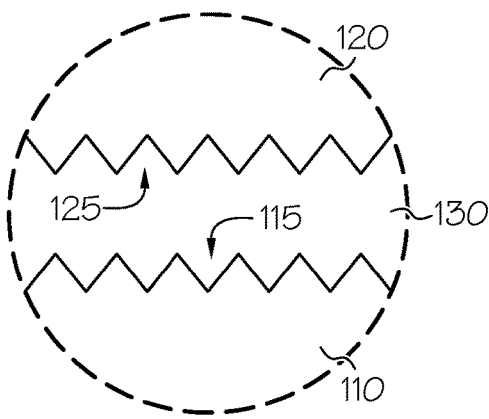

As shown in FIG. 3, the carrier bonding surface 115 and the sheet bonding surface 125 can have the same or similar surface roughness (e.g. surface roughness Rq), depicted as relatively smooth (e.g. less than 0.8 nm), and the carrier bonding surface 115 and the sheet bonding surface 125 can be bonded with the surface modification layer 130 so that the carrier 110 is temporarily bonded with the sheet 120. As shown in FIG. 4, the carrier bonding surface 115 can have a surface roughness (e.g. surface roughness Rq), depicted as relatively smooth (e.g. less than 0.8 nm) and the sheet bonding surface 125 can have a surface roughness (e.g. surface roughness Rq), depicted as moderately rough (e.g. within a range from about 0.8 nm to about 5.0 nm). As shown, the surface modification layer 130 planarizes the moderately rough sheet bonding surface 125, such that the carrier bonding surface 115 and the sheet bonding surface 125 can be bonded with the surface modification layer 130 so that the carrier 110 is temporarily bonded with the sheet 120. As shown in FIG. 5, the carrier bonding surface 115 can have a surface roughness (e.g. surface roughness Rq), depicted as moderately rough (e.g. within a range from about 0.8 nm to about 5.0 nm) and the sheet bonding surface 125 can have a surface roughness (e.g. surface roughness Rq), depicted as relatively smooth (e.g. less than 0.8 nm). As shown, the surface modification layer 130 planarizes the moderately rough carrier bonding surface 115, such that the carrier bonding surface 115 and the sheet bonding surface 125 can be bonded with the surface modification layer 130 so that the carrier 110 is temporarily bonded with the sheet 120. As shown in FIG. 6, the carrier bonding surface 115 and the sheet bonding surface 125 can have the same or similar surface roughness (e.g. surface roughness Rq), depicted as moderately rough (e.g. within a range from about 0.8 nm to about 5.0 nm). As shown, the surface modification layer 130 can planarize the moderately rough carrier bonding surface 115 and the moderately rough sheet bonding surface 125, such that the carrier bonding surface 115 and the sheet bonding surface 125 can be bonded with the surface modification layer 130 so that the carrier 110 is temporarily bonded with the sheet 120. In other examples, the at least one of the carrier bonding surface 115 and the sheet bonding surface 125 can have any surface roughness (e.g. a surface roughness Rq greater than 5.0 nm), including a surface roughness Rq not explicitly disclosed herein, and the surface modification layer 130 can planarize the carrier bonding surface 115 and the sheet bonding surface 125, such that the carrier bonding surface 115 and the sheet bonding surface 125 can be bonded with the surface modification layer 130 so that the carrier 110 is temporarily bonded with the sheet 120.

As shown in FIGS. 3-6, the carrier bonding surface 115 and the sheet bonding surface 125 can be spaced apart from each other (e.g. not touching) with the surface modification layer 130 therebetween. In such a configuration, little to no covalent bonding between the carrier bonding surface 115 and the sheet bonding surface 125 is observed, even following processing at high temperatures. Rather, in such a configuration, the predominant force bonding the carrier bonding surface 115, the sheet bonding surface 125, and the surface modification layer 130 together is the van der Waals forces between the carrier bonding surface 115 and the surface modification layer 130 and the van der Waals forces between the sheet bonding surface 125 and the surface modification layer 130. Covalent bonding between the sheet bonding surface 125 and the surface modification layer 130 as well as covalent bonding between the carrier bonding surface 115 and the surface modification layer 130 may also occur as long as such covalent bonding has minimal or no impact on the ability to separate the carrier 110 and the sheet 120 from each other following processing. For example, the carrier 110 and the sheet 120 can be separated from each other by at least one of adhesive failure (e.g. where the surface modification layer 130 separates from at least one of the carrier bonding surface 115 and the sheet bonding surface 125) and cohesive failure (e.g. where the surface modification layer 130 separates from itself).

Figure 7:
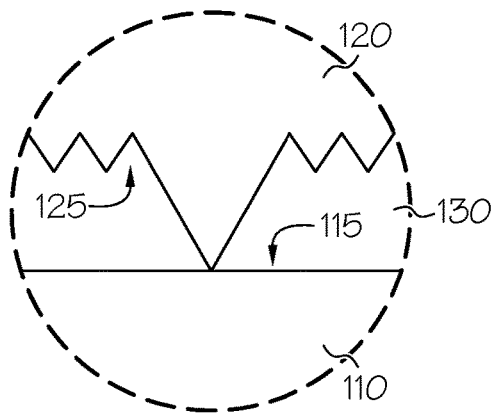
Figure 8:
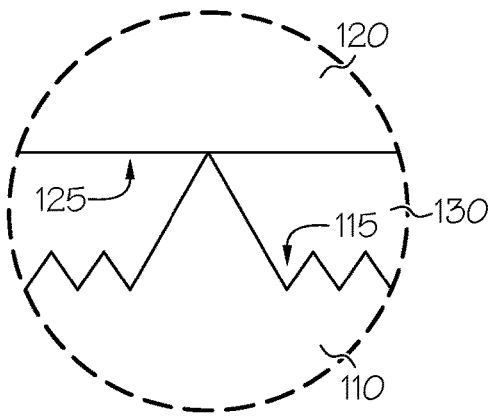
Figure 9:
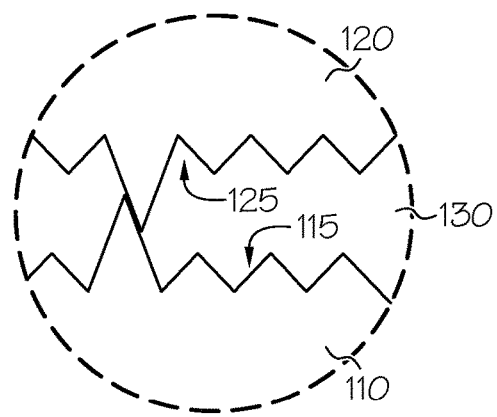

As shown in FIGS. 7-9, the carrier bonding surface 115 and the sheet bonding surface 125 can be spaced apart from each other (e.g. not touching) with the surface modification layer 130 therebetween in some locations, and contacting each other, without the surface modification layer 130 therebetween, in other locations. In such a configuration, little to no covalent bonding between the carrier bonding surface 115 and the sheet bonding surface 125 is observed in the regions where the carrier bonding surface 115 and the sheet bonding surface 125 are spaced apart from each other (e.g. not touching) with the surface modification layer 130 therebetween, even following processing at high temperatures. Covalent bonding may be observed between the carrier bonding surface 115 and the sheet bonding surface 125 in regions where the carrier bonding surface 115 and the sheet bonding surface 125 are contacting each other, without the surface modification layer 130 therebetween. In such a configuration, the predominant force bonding the carrier bonding surface 115, the sheet bonding surface 125, and the surface modification layer 130 together is still the van der Waals forces between the carrier bonding surface 115 and the surface modification layer 130 and the van der Waals forces between the sheet bonding surface 125 and the surface modification layer 130. As with the example embodiments illustrated in FIGS. 3-6, described above, covalent bonding between the sheet bonding surface 125 and the surface modification layer 130 as well as covalent bonding between the carrier bonding surface 115 and the surface modification layer 130 of the example embodiments illustrated in FIGS. 7-9 may also occur so long as such covalent bonding has minimal or no impact on the ability to separate the carrier 110 and the sheet 120 from each other following processing. For example, the carrier 110 and the sheet 120 can be separated from each other by at least one of adhesive failure (e.g. where the surface modification layer 130 separates from at least one of the carrier bonding surface 115 and the sheet bonding surface 125) and cohesive failure (e.g. where the surface modification layer 130 separates from itself). Moreover, because the predominant force bonding the carrier 110 and the sheet 120 is the van der Waals force between the surface modification layer 130 and at least one of the carrier bonding surface 115 and the sheet bonding surface 125, any covalent bonds formed between the carrier bonding surface 115 and the sheet bonding surface 125 (e.g. in regions where the carrier bonding surface 115 and the sheet bonding surface 125 are contacting) can be broken (e.g. following processing) without damaging (e.g. breaking into two or more pieces) either or both of the carrier 110 and the sheet 120 to allow separation of the carrier 110 and the sheet 120.

As shown in FIG. 7, the carrier bonding surface 115 can have a surface roughness (e.g. surface roughness Rq), depicted as relatively smooth (e.g. less than 0.8 nm) and the sheet bonding surface 125 can have a surface roughness (e.g. surface roughness Rq), depicted as moderately rough (e.g. within a range from about 0.8 nm to about 5.0 nm) with the moderately rough sheet bonding surface 125 contacting the relatively smooth carrier bonding surface 115 in some locations, without the surface modification layer 130 therebetween, and the moderately rough sheet bonding surface 125 being spaced apart from the relatively smooth carrier bonding surface 115, with the surface modification layer 130 therebetween, in other locations. As shown, the surface modification layer 130 planarizes the moderately rough sheet bonding surface 125, such that the carrier bonding surface 115, the sheet bonding surface 125, and the surface modification layer 130 can be bonded together to form a temporary bond between the carrier 110 and the sheet 120.

As shown in FIG. 8, the carrier bonding surface 115 can have a surface roughness (e.g. surface roughness Rq), depicted as moderately rough (e.g. within a range from about 0.8 nm to about 5.0 nm) and the sheet bonding surface 125 can have a surface roughness (e.g. surface roughness Rq), depicted as relatively smooth (e.g. less than 0.8 nm), with the moderately rough carrier bonding surface 115 contacting the relatively smooth sheet bonding surface 125 in some locations, without the surface modification layer 130 therebetween, and the moderately rough carrier bonding surface 115 being spaced apart from the relatively smooth sheet bonding surface 125, with the surface modification layer 130 therebetween, in other locations. As shown, the surface modification layer 130 planarizes the moderately rough carrier bonding surface 115, such that the carrier bonding surface 115, the sheet bonding surface 125, and the surface modification layer 130 can be bonded together to form a temporary bond between the carrier 110 and the sheet 120.

As shown in FIG. 9, the carrier bonding surface 115 and the sheet bonding surface 125 can have the same or similar surface roughness (e.g. surface roughness Rq), depicted as moderately rough (e.g. within a range from about 0.8 nm to about 5.0 nm) with the moderately rough sheet bonding surface 125 contacting the moderately rough carrier bonding surface 115 in some locations, without the surface modification layer 130 therebetween, and the moderately rough sheet bonding surface 125 being spaced apart from the moderately rough carrier bonding surface 115, with the surface modification layer 130 therebetween, in other locations. As shown, the surface modification layer 130 can planarize the moderately rough carrier bonding surface 115 and the moderately rough sheet bonding surface 125, such that the carrier bonding surface 115, the sheet bonding surface 125, and the surface modification layer 130 can be bonded together to form a temporary bond between the carrier 110 and the sheet 120.

FIGS. 10-14 show the carrier 110 including the carrier bonding surface 115, the sheet 120 including the sheet bonding surface 125, and at least one of a carrier surface modification layer 130a disposed on the carrier bonding surface 115 and a sheet surface modification layer 130b disposed on the sheet bonding surface 125. The at least one of the carrier surface modification layer 130a and the sheet surface modification layer 130b comprises a plasma polymerized material. The plasma polymerized material planarizes the at least one of the carrier bonding surface 115 and the sheet bonding surface 125. The carrier bonding surface 115, the sheet bonding surface 125, and the at least one of the carrier surface modification layer 130a and the sheet surface modification layer 130b are bonded together to form a temporary bond between the carrier 110 and the sheet 120.

With respect to the example embodiments illustrated in FIGS. 10-14, little to no covalent bonding between the carrier bonding surface 115 and the sheet bonding surface 125 is observed, even following processing at high temperatures. Rather, in such a configuration, the predominant force bonding the carrier bonding surface 115, the sheet bonding surface 125, and the at least one of the carrier surface modification layer 130a and the sheet surface modification layer 130b together is (i) the van der Waals forces between the carrier bonding surface 115 and the at least one of the carrier surface modification layer 130a and the sheet surface modification layer 130b; (ii) the van der Waals forces between the sheet bonding surface 125 and the at least one of the sheet surface modification layer 130b and the carrier surface modification layer 130a; and (iii) to the extent surface modification layers 130a and 130b are both present, the van der Waals forces between the carrier surface modification layer 130a and the sheet surface modification layer 130b. In addition, little to no covalent bonding between the carrier bonding surface 115 and the sheet bonding surface 125 is observed in the regions where the carrier bonding surface 115 and the sheet bonding surface 125 are spaced apart from each other (e.g. not touching) with the at least one of the carrier surface modification layer 130a and the sheet surface modification layer 130b therebetween, even following processing at high temperatures. Covalent bonding may be observed between the carrier bonding surface 115 and the sheet bonding surface 125 in regions where the carrier bonding surface 115 and the sheet bonding surface 125 are contacting each other, without the at least one of the carrier surface modification layer 130a and the sheet surface modification layer 130b therebetween. In such a configuration, the predominant force bonding the carrier bonding surface 115, the sheet bonding surface 125, and the at least one of the carrier surface modification layer 130a and the sheet surface modification layer 130b together is still: (i) the van der Waals forces between the carrier bonding surface 115 and the at least one of the carrier surface modification layer 130a and the sheet surface modification layer 130b; (ii) the van der Waals forces between the sheet bonding surface 125 and the at least one of the sheet surface modification layer 130b and the carrier surface modification layer 130a; and (iii) to the extent surface modification layers 130a and 130b are both present, the van der Waals forces between the carrier surface modification layer 130a and the sheet surface modification layer 130b. As with the example embodiments illustrated in FIGS. 3-9, described above, covalent bonding between the carrier bonding surface 115 and the at least one of the carrier surface modification layer 130a and the sheet surface modification layer 130b as well as covalent bonding between the sheet bonding surface 125 and the at least one of the sheet surface modification layer 130b and the carrier surface modification layer 130a, as well as covalent bonding between the surface modification layers 130a and 130b when both are present, of the example embodiments illustrated in FIGS. 10-14 may also occur so long as such covalent bonding has minimal or no impact on the ability to separate the carrier 110 and the sheet 120 from each other following processing. For example, the carrier 110 and the sheet 120 can be separated from each other by at least one of adhesive failure (e.g. where the at least one of the carrier surface modification layer 130a and the sheet surface modification layer 130b separates from at least one of the carrier bonding surface 115 and the sheet bonding surface 125) and cohesive failure (e.g. where the at least one of the carrier surface modification layer 130a and the sheet surface modification layer 130b separates from at least one of itself and each other). Moreover, because the predominant force bonding the carrier 110 and the sheet 120 is (i) the van der Waals forces between the carrier bonding surface 115 and the at least one of the carrier surface modification layer 130a and the sheet surface modification layer 130b; (ii) the van der Waals forces between the sheet bonding surface 125 and the at least one of the sheet surface modification layer 130b and the carrier surface modification layer 130a; and (iii) to the extent surface modification layers 130a and 130b are both present, the van der Waals forces between the carrier surface modification layer 130a and the sheet surface modification layer 130b, any covalent bonds formed between the carrier bonding surface 115 and the sheet bonding surface 125 (e.g. in regions where the carrier bonding surface 115 and the sheet bonding surface 125 are contacting) can be broken (e.g. following processing) without damaging (e.g. breaking into two or more pieces) either or both of the carrier 110 and the sheet 120 to allow separation of the carrier 110 and the sheet 120.

Figure 10:
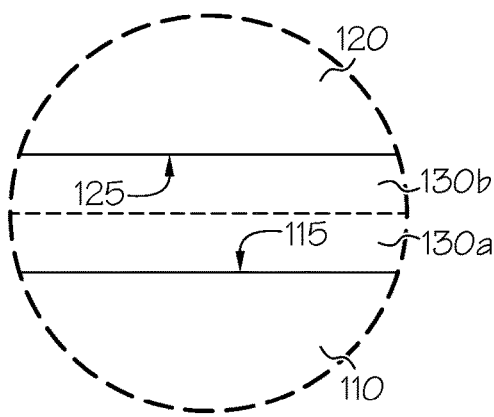

FIG. 10 shows, with respect to the at least one of the carrier surface modification layer 130a and the sheet surface modification layer 130b, the article comprises both the carrier surface modification layer 130a disposed on the carrier bonding surface 115 and the sheet surface modification layer 130b disposed on the sheet bonding surface 125. In one example, at least a portion of at least one of the sheet bonding surface 125 penetrates into the carrier surface modification layer 130a and the carrier bonding surface 115 penetrates into the sheet surface modification layer 130b. In other examples, the sheet bonding surface 125 may not extend beyond the sheet surface modification layer 130b, and the carrier bonding surface 115 may not extend beyond the carrier surface modification layer 130a. In still other examples, at least a portion of the sheet bonding surface 125 may penetrate into the carrier surface modification layer 130a, whereas the carrier bonding surface 115 may not extend beyond the carrier surface modification layer 130a. And in still other examples, at least a portion of the carrier bonding surface 115 may penetrate into the sheet surface modification layer 130b, whereas the sheet bonding surface 125 may not extend beyond the sheet surface modification layer 130b.

Figure 11:
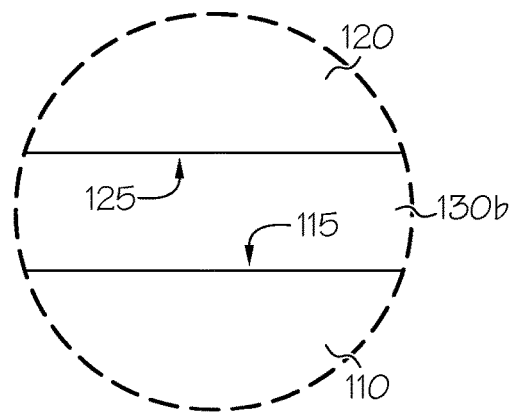
Figure 13:
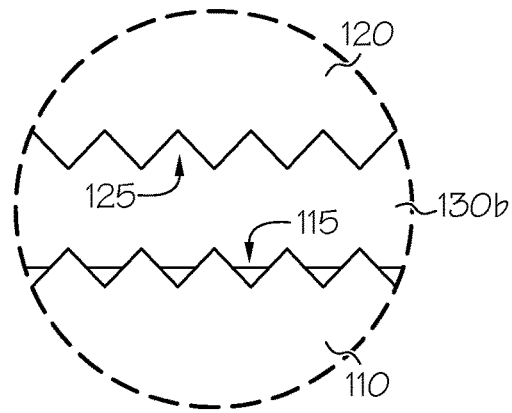

FIG. 11 shows, with respect to the at least one of the carrier surface modification layer 130a and the sheet surface modification layer 130b, the article comprises only the sheet surface modification layer 130b disposed on the sheet bonding surface 125. As shown in FIG. 13, at least a portion of the carrier bonding surface 115 penetrates into the sheet surface modification layer 130b. As shown the sheet surface modification layer 130b planarizes the sheet bonding surface 125 such that the carrier bonding surface 115, the sheet bonding surface 125, and the sheet surface modification layer 130b (with at least a portion of the carrier bonding surface 115 penetrating thereinto) are bonded together to form a temporary bond between the carrier 110 and the sheet 120.

Figure 12:
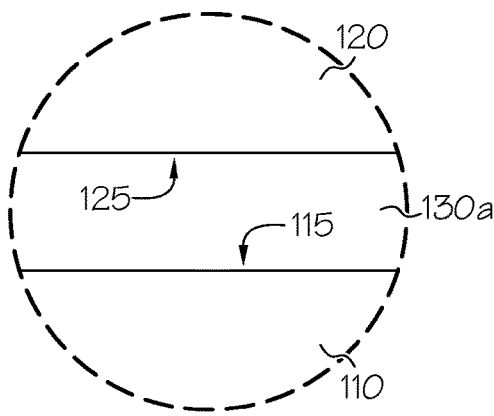
Figure 14:
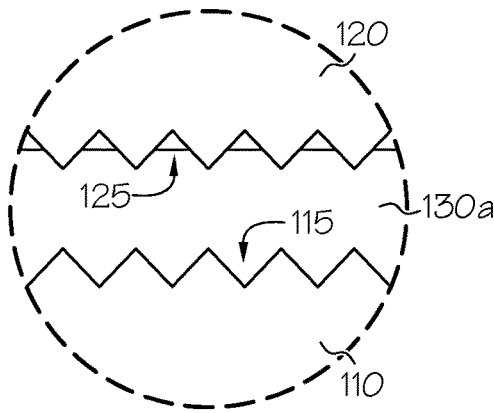

FIG. 12 shows, with respect to the at least one of the carrier surface modification layer 130a and the sheet surface modification layer 130b, the article comprises only the carrier surface modification layer 130a disposed on the carrier bonding surface 115. As shown in FIG. 14, at least a portion of the sheet bonding surface 125 penetrates into the carrier surface modification layer 130a. As shown the carrier surface modification layer 130a planarizes the carrier bonding surface 115 such that the carrier bonding surface 115, the sheet bonding surface 125, and the carrier surface modification layer 130a (with at least a portion of the sheet bonding surface 125 penetrating thereinto) are bonded together to form a temporary bond between the carrier 110 and the sheet 120.

As shown in FIG. 13 and FIG. 14, gaps (e.g. air gaps or "blisters," as is known in the art) can be formed between: (i) the carrier bonding surface 115 and the at least one of the carrier surface modification layer 130a and the sheet surface modification layer 130b; and/or (ii) the sheet bonding surface 125 and the at least one of the sheet surface modification layer 130b and the carrier surface modification layer 130a. In other examples (e.g. FIG. 10) the amount of penetration of (i) the carrier bonding surface 115 into the at least one of the carrier surface modification layer 130a and the sheet surface modification layer 130b; and/or (ii) the sheet bonding surface 125 into the at least one of the sheet surface modification layer 130b and the carrier surface modification layer 130a, can be controlled such that no blisters are formed between (i) the carrier bonding surface 115 and the at least one of the carrier surface modification layer 130a and the sheet surface modification layer 130b; and/or the sheet bonding surface 125 and the at least one of the sheet surface modification layer 130b and the carrier surface modification layer 130a. For example, by at least one of adjusting at least one of the elastic modulus and the plasticity of the at least one of the carrier surface modification layer 130a and the sheet surface modification layer 130b, and applying varying amounts of pressure (e.g. by lamination, or in an autoclave) on at least one of the carrier 110 and the sheet 120, and varying the thickness of the at least one of the carrier surface modification layer 130a and the sheet surface modification layer 130b, the at least one of the carrier bonding surface 115 and the sheet bonding surface 125 can penetrate a greater amount or a lesser amount into the at least one of the carrier surface modification layer 130a and the sheet surface modification layer 130b. In other examples, penetration of at least one of (i) the carrier bonding surface 115 into the at least one of the carrier surface modification layer 130a and the sheet surface modification layer 130b and (ii) the sheet bonding surface 125 into the at least one of the sheet surface modification layer 130b and the carrier surface modification layer 130a, can provide an energy of adhesion (e.g. based on van der Waals bonding) that is less than, equal to, or greater than an energy of adhesion (e.g. based on at least one of van der Waals bonding and covalent bonding) between surfaces which, for example, have no surface modification layer (e.g. a compliant surface layer) therebetween, irrespective of the relative surface roughness of either or both of the surfaces.

It is to be understood that any one or more combinations of the embodiments illustrated in FIGS. 3-14 can be combined to temporarily bond the carrier 110 and the sheet 120. Further, in one example, the at least one of the planarized carrier bonding surface and the planarized sheet bonding surface can have a surface roughness Rq less than about 0.8 nm. In other example, the at least one of the carrier bonding surface 115 and the sheet bonding surface 125, prior to planarization, can have a surface roughness Rq within a range of about 0.8 nm to about 5.0 nm. As provided above, other surface roughnesses of the carrier bonding surface 115, the sheet bonding surface 125, and the at least one of the carrier surface modification layer 130a and the sheet surface modification layer 130b are contemplated herein.

As noted, the surface modification layer 130 can include a plasma polymerized material. In one example, the plasma polymerized material can include a plasma polymer film formed by a chemical vapor deposition process in which precursors are activated and deposited by a plasma to form polymeric materials. In another example, the plasma polymerized material (e.g. the plasma polymer film) can include aliphatic or aromatic hydrocarbons, polyesters, or polyimides. In still other examples plasma polymers may be deposited under atmospheric or reduced pressure. Still further, plasma polymerized material can be formed by plasma deposition that includes plasma excitation (e.g. DC or RF parallel plate, Inductively Coupled Plasma (ICP), Electron Cyclotron Resonance (ECR), downstream microwave, or RF plasma) from source gases. In some examples, source gases can include fluorocarbon sources (e.g. CF4, CHF3, C2F6, C3F6, C2F2, CH3F, C4F8, chlorofluoro carbons, or hydrochlorofluoro carbons); hydrocarbons (e.g. alkanes, including methane, ethane, propane, or butane); alkenes (including ethylene or propylene, for example); alkynes (including acetylene, for example); or aromatics (including benzene or toluene, for example). In other examples source gases can include hydrogen or other gas sources, including SF6. In addition, plasma polymerization creates a layer of highly cross-linked material. In some examples, control of reaction conditions and source gases can be used to control the film thickness, density, and chemistry to, for example, tailor the functional groups to a desired application. It is to be understood that the specific plasma polymer films described herein are non-limiting representative examples, and one skilled in the art will recognize similar advantages may be achieved with different plasma geometry and source materials, including plasma polymers not explicitly disclosed herein. In particular, the present application contemplates any plasma polymerized material configured to planarize a surface as within the scope of disclosure.

Moreover, the following specific examples are in accordance with example embodiments described above and are to be understood as non-limiting representative examples.

In a first example, aliphatic plasma polymer films were deposited in an Oxford PlasmaLab 100 etch tool from methane and hydrogen. Process conditions were 2 standard cubic centimeters per minute (sccm) methane, 38 sccm hydrogen, 25 milli Torrs (mT) pressure 275 Watts (W) 13.56 Mega Hertz (MHz) Radio Frequency (RF). Process times were varied to adjust plasma polymer thickness from 11 to 60 nano meters (nm). Thickness was measured on an n&k analyzer using an amorphous carbon model. Surfaces were activated in the same Oxford tool with 25 sccm Nitrogen, 25 sccm Oxygen, O2 10 mT 300 W RF and a process time of 5 seconds (sec.). Further, 200 micrometer (um, or micron) thick glass substrates were etched in an aqueous solution 433 milli liters (ml) De-Ionized (DI) water, 106 ml hydrochloric acid, and 11 ml 49% hydrofluoric acid at room temperature for 1 minute (min.). This produced a surface roughness of 1.0 nm Root Mean Square (RMS, Rq) as measured by Atomic Force Microscope (AFM). The roughened thin glass was bonded to the plasma polymer surface which was then bonded together with the carrier by applying the substrate to the carrier. Because of the high surface energy of the plasma polymer, surface bonding was self-propagating. A Teflon squeegee was used to remove any entrapped bubbles formed by particles and curvature in the bonding front. Bonded samples were annealed for 10 min at 300° C. in flowing nitrogen in an MPT rapid thermal processing system (RTP) on a silicon carbide susceptor. Bond energy was measured by the wedge test. As shown in Table 1 below, roughness (Rq) was observed to decrease with increasing plasma polymer thickness. The bond energy increases with increasing polymer thickness reaching a value near that expected for van der Waals interaction between the thin glass and treated plasma polymer coated carrier as surface roughness decreases below 0.8 nm RMS (Rq).

TABLE 1

| Thickness (nm) | Bond Energy (mJ/m2) | Rq (nm) |
| --- | --- | --- |
| 11.2 | 14.7 | 1.01 |
| 16.3 | 14.7 | 0.82 |
| 23.8 | 205.3 | 0.81 |
| 39.2 | 210.1 | 0.72 |
| 57.3 | 156.2 | 0.57 |

In a second example, a set of thin glass interposers were formed from a 200 um thick glass substrate made of Corning® EAGLE XG® glass by a process of laser damage to form vias, and etch in the HF—HNO3 solution described above. Etching the vias reduced the thickness of the substrate to 180 um, produced 50 um diameter vias, and AFM showed the surface roughness after etching as 1 nm Rq. These interposer samples were coated with a plasma polymer of varying thickness as described with respect to the first example and were bonded to a 0.7 mm thick glass carrier made of Corning® EAGLE EXG® glass. Samples were annealed in an RTP system in N2 at 300° C. for 10 min. Bond Energy (BE, in milli Joules per meter squared (mJ/m2)) versus plasma polymer thickness (in nm) is shown below in Table 2. For a plasma polymer thickness of greater than 40 nm, a suitable bond energy of greater than 200 mJ/m2 can be achieved.

TABLE 2

| Polymer thickness (nm) | BE (mJ/m2) |
|---|---|
| 11 | 48 |
| 17 | 79 |
| 30 | 128 |
| 39 | 240 |
| 57 | 250 |

In a third example, a set of thin glass interposers was formed from a 200 um thick glass substrate made of Corning® EAGLE XG® glass by a process of laser damage to form vias, and etch in the HF—HNO3 solution described above. Etching the vias reduces the thickness of the substrate to 180 um and produces 30 um diameter vias. These interposer samples were coated with a plasma polymer of varying thickness in the Oxford tool as described in the first example except plasma polymer deposition conditions were 10 sccm ethylene 50 sccm hydrogen 5 mT pressure 1500 W RF applied to the coil 50 W RF bias followed by 5 sec treatment time at 35 sccm nitrogen 5 sccm oxygen 15 mT pressure 800 W RF applied to the coil 50 W RF bias. Interposers were bonded to a 0.7 mm thick glass carrier made of Corning® EAGLE EXG® glass. Samples were annealed in an RTP system in N2 at 300° C. for 10 min. A bond energy of 312 mJ/m2 was found for a polymer thickness of 13.7 nm.

It will be apparent to those skilled in the art that various modifications and variations can be made to the present disclosure without departing from the spirit and scope of the subject matter claimed.

What is claimed is:

1. An article comprising:
    a carrier comprising a carrier bonding surface having an underlying surface roughness;
    a sheet comprising a sheet bonding surface having an underlying surface roughness; and
    a surface modification layer disposed on at least one of the carrier bonding surface and the sheet bonding surface,
    wherein the surface modification layer comprises a plasma polymerized material having of thickness of greater than 10 nm,
    wherein the plasma polymerized material planarizes the at least one of the carrier bonding surface and the sheet bonding surface to produce a planarized surface roughness that is at least 1.2 nm less than the underlying surface roughness and less than 0.8 nm, and
    wherein the carrier bonding surface and the sheet bonding surface are bonded with the surface modification layer so that the carrier is temporarily bonded to the sheet.

2. The article of claim 1, wherein the underlying surface roughness of the at least one of the carrier bonding surface and the sheet bonding is within a range of about 2.0 nm to about 5.0 nm.

3. The article of claim 1, wherein the underlying surface roughness of the at least one of the carrier bonding surface and the sheet bonding surface is greater than about 2.0 nm.

4. The article of claim 1, wherein the surface modification layer has at least one of an elastic modulus and a plasticity configured to allow penetration of at least a portion of at least one of the carrier bonding surface and the sheet bonding surface into the surface modification layer.

5. The article of claim 4, wherein the elastic modulus is within a range of from about 0.6 GPa to about 20 GPa.

6. The article of claim 1, wherein at least one of the carrier and the sheet comprises glass.

7. The article of claim 1, wherein the carrier has a thickness within a range of from about 200 microns to about 3 mm.

8. The article of claim 1, wherein the sheet has a thickness less than or equal to about 300 microns.

9. The article of claim 1, wherein the surface modification layer is disposed on the carrier bonding surface, and wherein at least a portion of the sheet bonding surface penetrates into the surface modification layer.

10. The article of claim 1, the surface modification layer is disposed on the sheet bonding surface, and wherein at least a portion of the carrier bonding surface penetrates into the modification layer.

11. The article of claim 1, wherein the surface modification layer is disposed on the carrier bonding surface and further comprising a second surface modification layer disposed the sheet bonding surface, and wherein at least one of (i) at least a portion of the sheet bonding surface penetrates into the surface modification layer, and (ii) at least a portion of the carrier bonding surface penetrates into the second surface modification layer.

12. The article of claim 1, wherein the carrier and the sheet have an adhesion energy between about 200-1000 mJ/m$^2$.

13. A method of making an article comprising:
    depositing a surface modification layer having of thickness of greater than 10 nm on at least one of a carrier bonding surface of a carrier and a sheet bonding surface of a sheet having wherein at least one of the carrier bonding surface and the sheet bonding surface have an underlying surface roughness greater than about 2.0 nm, wherein the surface modification layer comprises a plasma polymerized material, and wherein the depositing of the plasma polymerized material planarizes the at least one of the carrier bonding surface and the sheet bonding surface to produce a planarized surface roughness that is at least 1.2 nm less than the underlying surface roughness and less than 0.8 nm; and
    bonding the carrier bonding surface and the sheet bonding surface with the surface modification layer so that the carrier is temporarily bonded with the sheet.

14. The method of claim 13, wherein the underlying surface roughness of the at least one of the carrier bonding surface and the sheet bonding surface is within a range of about 2.0 nm to about 5.0 nm.

15. The method of claim 13, wherein at least one of an elastic modulus and a plasticity of the surface modification layer allow penetration of at least a portion of at least one of the carrier bonding surface and the sheet bonding surface into the surface modification layer.

* * * * *

UNITED STATES PATENT AND TRADEMARK OFFICE
CERTIFICATE OF CORRECTION

PATENT NO. : 11,905,201 B2
APPLICATION NO. : 15/739321
DATED : February 20, 2024
INVENTOR(S) : Robert Alan Bellman et al.

It is certified that error appears in the above-identified patent and that said Letters Patent is hereby corrected as shown below:

On the Title Page

On the page 5, in Column 2, item (56) under "Other Publications", Line 67, delete "Cyloaddtion";" and insert -- Cycloaddition"; --.

On the page 5, in Column 2, item (56) under "Other Publications", Line 72, delete "Perfluororelastomer" and insert -- Perfluoroelastomer --.

On the page 6, in Column 1, item (56) under "Other Publications", Line 32, delete "Writien" and insert -- Written --.

On the page 6, in Column 1, item (56) under "Other Publications", Line 35, delete "Writien" and insert -- Written --.

On the page 6, in Column 1, item (56) under "Other Publications", Line 38, delete "Writien" and insert -- Written --.

On the page 6, in Column 1, item (56) under "Other Publications", Line 41, delete "Writien" and insert -- Written --.

On the page 6, in Column 1, item (56) under "Other Publications", Line 45, delete "Aurthority;" and insert -- Authority; --.

On the page 6, in Column 2, item (56) under "Other Publications", Line 17, delete "Aurthority;" and insert -- Authority; --.

On the page 6, in Column 2, item (56) under "Other Publications", Line 21, delete "WO2014/'151353." and insert -- WO2014/151353. --.

Signed and Sealed this
Second Day of July, 2024

Katherine Kelly Vidal
*Director of the United States Patent and Trademark Office*

CERTIFICATE OF CORRECTION (continued)
U.S. Pat. No. 11,905,201 B2

On the page 6, in Column 2, item (56) under "Other Publications", Line 31, delete "Irfrared" and insert -- Infrared --.